United States Patent
Noh et al.

(10) Patent No.: US 12,237,931 B2
(45) Date of Patent: Feb. 25, 2025

(54) METHOD, DEVICE, AND SYSTEM FOR ALLOCATING HARQ PROCESS NUMBER FOR DOWNLINK TRANSMISSION AND UPLINK TRANSMISSION IN WIRELESS COMMUNICATION SYSTEM

(71) Applicant: WILUS INSTITUTE OF STANDARDS AND TECHNOLOGY INC., Gyeonggi-do (KR)

(72) Inventors: Minseok Noh, Gyeonggi-do (KR); Geunyoung Seok, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/634,885

(22) Filed: Apr. 13, 2024

(65) Prior Publication Data

US 2024/0259143 A1 Aug. 1, 2024

Related U.S. Application Data

(63) Continuation of application No. PCT/KR2022/015541, filed on Oct. 13, 2022.

(30) Foreign Application Priority Data

Oct. 13, 2021 (KR) .................. 10-2021-0135513
Oct. 14, 2021 (KR) .................. 10-2021-0136345

(51) Int. Cl.
*H04L 1/1829* (2023.01)
*H04L 1/1822* (2023.01)

(52) U.S. Cl.
CPC .......... *H04L 1/1854* (2013.01); *H04L 1/1822* (2013.01)

(58) Field of Classification Search
CPC ... H04W 28/04; H04W 72/04; H04W 72/042; H04L 5/0007; H04L 1/1822; H04L 1/1854
(Continued)

(56) References Cited

U.S. PATENT DOCUMENTS 11,381,352 B2 * 7/2022 Dinan .................. H04W 52/38
2019/0116005 A1 * 4/2019 Harada ................. H04L 1/1671
(Continued)

FOREIGN PATENT DOCUMENTS

JP WO 2020/091080 A1 * 5/2020 ............ H04W 72/04
WO WO2023/063760 4/2023

OTHER PUBLICATIONS

3GPP TSG RAN WG1 #106-e, e-Meeting, Aug. 16-27, 2021, R1-2108636, Agenda Item: 8.2.5, Source: Moderator (LG Electronics), Title: Summary #6 of PDSCH/PUSCH enhancements (Scheduling/HARQ). (Year: 2021).*
(Continued)

*Primary Examiner* — Peter G Solinsky
*Assistant Examiner* — Sanjay K Dewan
(74) *Attorney, Agent, or Firm* — WOMBLE BOND DICKINSON (US) LLP

(57) ABSTRACT

Disclosed is a method for a terminal to transmit a physical uplink shared channel (PUSCH) to a base station in a wireless communication system. The terminal may: receive radio resource control (RRC) configuration information related to the configuration of slots from the base station; and receive, from the base station, a physical downlink control channel (PDCCH) including downlink control infor-
(Continued)

mation (DCI) scheduling multiple physical uplink shared channels (PUSCHs) for the terminal.

19 Claims, 25 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0037314 A1* | 1/2020 | Xiong .................... | H04L 1/1812 |
| 2023/0189263 A1* | 6/2023 | Lee .......................... | H04L 27/26 370/329 |
| 2023/0224880 A1* | 7/2023 | Xiong ............... | H04W 72/0453 370/329 |

OTHER PUBLICATIONS

3GPP TSG RAN WG1 Meeting #106-bis-e, e-Meeting, Oct. 11-19, 2021, R1-2109602, Source: Intel Corporation, Title: Discussion on PDSCH/PUSCH enhancements for extending NR up to 71 GHz, Agenda item: 8.2.5, R1-2109602. (Year: 2021).*
3GPP TS 38.331 v16.6.0 (Sep. 2021), 3rd Generation Partnership Project; Technical Specification Group Radio Access Network; NR; Radio Resource Control (RRC) protocol specification (Release 16). (Year: 2019).*
Office Action dated Feb. 8, 2023 for Korean Patent Application No. 10-2022-0131861 and its English translation provided by Applicant's foreign counsel.
Moderator (LG Electronics): "Summary #1 of PDSCH/PUSCH enhancements (Scheduling/HARQ)", 3GPP TSG RAN WG1 #106bis-e, R1-210xxxx, e-Meeting, Oct. 13, 2021, pp. 1-58.
3GPP TS 38.331 V16.6.0 (Sep. 2021): "3rd Generation Partnership Project; Technical Specification Group Radio Access Network; NR; Radio Resource Control (RRC) protocol specification (Release 16)", Sep. 21, 2021, pp. 1-961.
Notice of Allowance dated Jun. 27, 2023 for Korean Patent Application No. 10-2022-0131861 and its English translation provided by Applicant's foreign counsel.
International Search Report for PCT/KR2022/015541 mailed on Feb. 14, 2023 and its English translation from WIPO (now published as WO2023/063760).
Written Opinion of the International Searching Authority for PCT/KR2022/015541 mailed on Feb. 14, 2023 and its English translation from WIPO (now published as WO2023/063760).
Moderator (LG Electronics): "Summary #6 of PDSCH/PUSCH enhancements (Scheduling/HARQ)", 3GPP TSG RAN WG1 #106-e, R1-2108636, e-Meeting, Aug. 31, 2021, pp. 1-120.
3GPP TS 38.331 V16.6.0 (Sep. 2021): "3rd Generation Partnership Project; Technical Specification Group Radio Access Network; NR; Radio Resource Control (RRC) protocol specification (Release 16)", Sep. 28, 2021, pp. 1-961.
Intel Corporation: "Discussion on PDSCH/PUSCH enhancements for extending NR up to 71 GHz", 3GPP TSG RAN WG1 Meeting #106-bis-e, R1-2109602, e-Meeting, Oct. 2, 2021, pp. 1-35.

* cited by examiner (a) K1=2

(b) K1=1

PDSCH 후보들

METHOD, DEVICE, AND SYSTEM FOR ALLOCATING HARQ PROCESS NUMBER FOR DOWNLINK TRANSMISSION AND UPLINK TRANSMISSION IN WIRELESS COMMUNICATION SYSTEM

TECHNICAL FIELD

The present invention relates to a wireless communication system. Specifically, the present invention relates to a method, a device, and a system for determining and transmitting resources of a downlink shared channel and an uplink shared channel.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

An aspect of the present invention is to provide a method of, in a wireless communication system, in particular, a cellular wireless communication system, determining resources for a downlink shared channel and an uplink shared channel and assigning a HARQ process number, and a device therefor.

Solution to Problem

A terminal for transmitting a physical uplink shared channel (PUSCH) in a wireless communication system may include: a communication module; and a processor configured to control the communication module, wherein the processor is configured to: receive radio resource control (RRC) configuration information related to a configuration of a slot from a base station; and receive, from the base station, a physical downlink control channel (PDCCH) including downlink control information (DCI) scheduling multiple physical uplink shared channels (PUSCHs) for the terminal, the DCI indicates a hybrid automatic repeat request (HARQ) process number of a first PUSCH among the multiple PUSCHs, and a HARQ process number of a PUSCH included in the multiple PUSCHs is increased compared to a HARQ process number of a previous PUSCH of the PUSCH according to whether a symbol of a slot on which the PUSCH is scheduled overlaps with a symbol indicated as being downlink or flexible by the RRC configuration information.

In addition, in the present invention, when the symbol of the slot on which the PUSCH is scheduled is indicated as an uplink symbol by the RRC configuration information, the HARQ process number of the PUSCH is obtained by increasing, by "1", the HARQ process number of the previous PUSCH.

In addition, in the present invention, when the symbol of the slot on which the PUSCH is scheduled overlaps with a downlink symbol indicated by the RRC configuration information, the PUSCH is not transmitted on the slot.

In addition, in the present invention, the HARQ process number of the PUSCH is not increased compared to the HARQ process number of the previous PUSCH.

In addition, in the present invention, when the symbol of a slot on which a next PUSCH of the PUSCH among the multiple PUSCHs is scheduled is indicated as an uplink symbol by the RRC configuration information, a HARQ process number of the next PUSCH is obtained by increasing, by "1", the HARQ process number of the previous PUSCH.

In addition, in the present invention, when the symbol of the slot on which the PUSCH is scheduled overlaps with a flexible symbol indicated by the RRC configuration information, the HARQ process number of the PUSCH is obtained by increasing, by "1", the HARQ process number of the previous PUSCH according to whether a particular signal is configured on the flexible symbol.

In addition, in the present invention, the particular signal is a synchronization signal/PBCH block (SSB) indicated by SSBpositioninburst that is a higher layer parameter of RRC configuration information.

In addition, in the present invention, when the particular signal is not configured on the flexible symbol, the HARQ process number of the PUSCH is obtained by increasing, by "1", the HARQ process number of the previous PUSCH.

In addition, in the present invention, the HARQ process number of the PUSCH is obtained by increasing, by "1", the HARQ process number of the previous PUSCH regardless of whether the symbol of the slot on which the PUSCH is scheduled is indicated as being uplink, downlink, or flexible by a slot format indicator (SFI).

In addition, in the present invention, a symbol of a slot on which the first PUSCH is transmitted does not overlap with a symbol indicated as being downlink by the RRC configuration information.

In addition, the present invention provides a terminal for receiving a physical downlink shared channel (PDSCH) in a wireless communication system may include: a communication module; and a processor, wherein the processor is configured to: receive radio resource control (RRC) configuration information related to a configuration of a slot from a base station; and receive, from the base station, a physical downlink control channel (PDCCH) including downlink control information (DCI) scheduling multiple physical downlink shared channels (PDSCHs) for the terminal, the DCI indicates a hybrid automatic repeat request (HARQ) process number of a first PDSCH among the multiple PDSCHs, and a HARQ process number of a PDSCH included in the multiple PDSCHs is increased compared to a HARQ process number of a previous PDSCH of the PDSCH according to whether a symbol of a slot on which the PDSCH is scheduled overlaps with a symbol indicated as being uplink or flexible by the RRC configuration information.

In addition, in the present invention, when the symbol of the slot on which the PDSCH is scheduled is indicated as a downlink symbol by the RRC configuration information, the HARQ process number of the PDSCH is obtained by increasing, by "1", the HARQ process number of the previous PDSCH.

In addition, in the present invention, when the symbol of the slot on which the PDSCH is scheduled overlaps with an uplink symbol indicated by the RRC configuration information, the PDSCH is not received on the slot.

In addition, in the present invention, the HARQ process number of the PDSCH is not increased compared to the HARQ process number of the previous PDSCH.

In addition, in the present invention, when the symbol of a slot on which a next PDSCH of the PDSCH among the multiple PDSCHs is scheduled is indicated as a downlink symbol by the RRC configuration information, a HARQ process number of the next PDSCH is obtained by increasing, by "1", the HARQ process number of the previous PDSCH.

In addition, in the present invention, when the symbol of the slot on which the PDSCH is scheduled overlaps with a flexible symbol indicated by the RRC configuration information, the HARQ process number of the PDSCH is obtained by increasing, by "1", the HARQ process number of the previous PDSCH.

In addition, in the present invention, the HARQ process number of the PDSCH is obtained by increasing, by "1", the HARQ process number of the previous PDSCH regardless of whether the symbol of the slot on which the PDSCH is scheduled is indicated as being uplink, downlink, or flexible by a slot format indicator (SFI).

In addition, in the present invention, a symbol of a slot on which the first PDSCH is transmitted does not overlap with a symbol indicated as being uplink by the RRC configuration information.

In addition, the present invention provides a method including: receiving radio resource control (RRC) configuration information related to a configuration of a slot from a base station; and receiving, from the base station, a physical downlink control channel (PDCCH) including downlink control information (DCI) scheduling multiple PUSCHs for the terminal, wherein the DCI indicates a hybrid automatic repeat request (HARQ) process number of a first PUSCH among the multiple PUSCHs, and a HARQ process number of a PUSCH included in the multiple PUSCHs is increased compared to a HARQ process number of a previous PUSCH of the PUSCH according to whether a symbol of a slot on which the PUSCH is scheduled overlaps with a symbol indicated as being downlink or flexible by the RRC configuration information.

Advantageous Effects of Invention

According to an embodiment of the present invention, a terminal can efficiently determine resources for data and control information to be transmitted through an uplink shared channel, and efficiently transmit data and uplink control information to a base station through the uplink shared channel.

In addition, according to an embodiment of the present invention, a terminal can efficiently determine resources for data and control information to be received through a downlink shared channel, and efficiently receive the downlink shared channel from a base station.

In addition, according to the present invention, in a case where multiple PUSCHs or multiple PDSCHs are scheduled, HARQ process numbers therefor can be efficiently configured.

In addition, according to the present invention, in a case where multiple PDSCHs are scheduled, when a symbol of a slot in which each of the multiple PDSCHs is scheduled overlaps with a symbol indicated to be flexible by RRC configuration information, a HARQ process number is increased regardless of PDSCH reception so that the ambiguity between a terminal and a base station depending on whether the terminal has detected an SFI can be removed.

In addition, according to the present invention, in a case where multiple PUSCHs are scheduled, when a symbol of a slot in which each of the multiple PUSCHs is scheduled overlaps with a symbol indicated to be flexible by RRC configuration information, a HARQ process number is increased considering only whether reception of a particular signal (e.g., synchronization signal/PBCH block (SSB)) is configured in the symbol, regardless of PUSCH transmission so that the ambiguity between a terminal and a base station depending on whether the terminal has detected an SFI can be removed.

The effects obtainable in the present invention are not limited to the above-mentioned effects, and other effects not mentioned will be clearly understood by those of ordinary skill in the art from the following description.

BEST MODE FOR CARRYING OUT THE INVENTION

Figure 1:
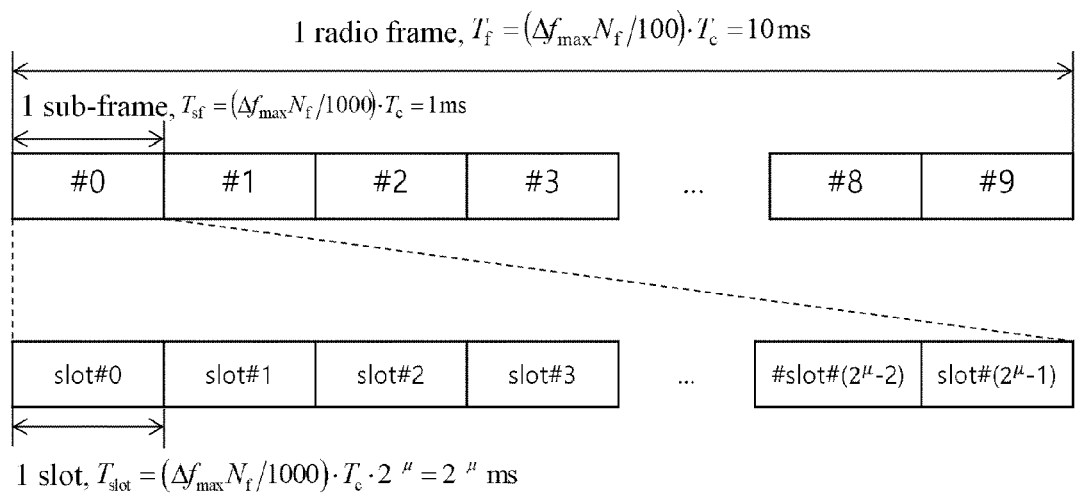
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f /100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 24 slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
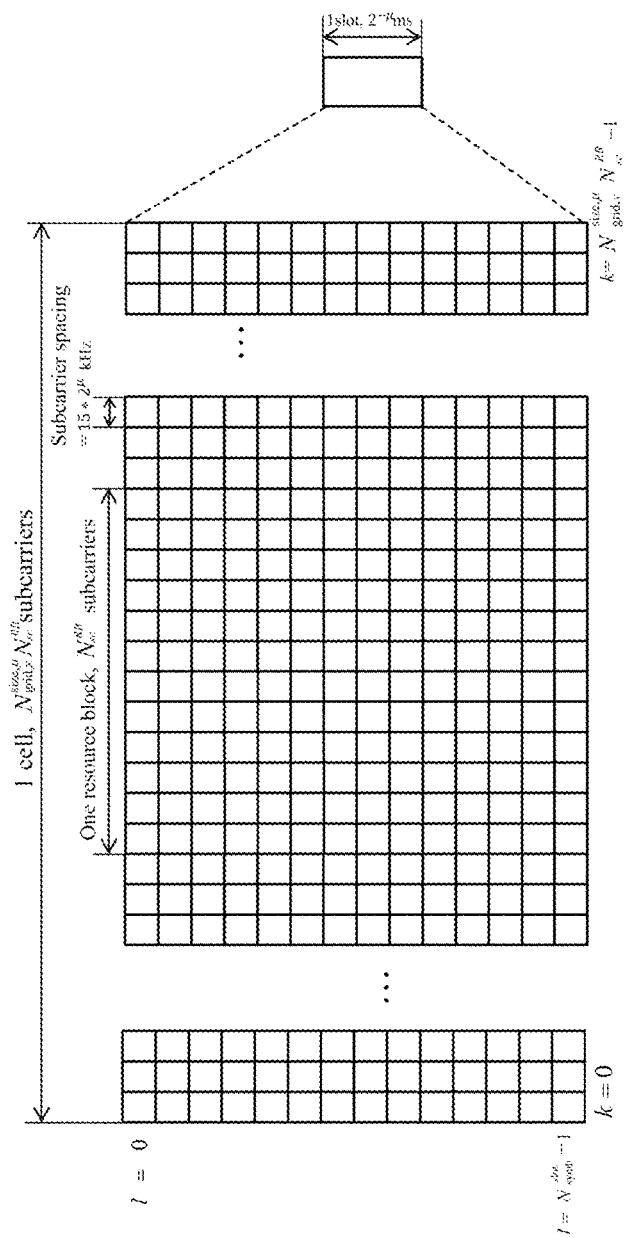
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present invention may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | \multicolumn{14}{c|}{Symbol number in a slot} | index | \multicolumn{14}{c|}{Symbol number in a slot} |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | X | X | X | X | X | 34 | D | X | U | U | U | U | U | U | U | U | U | U | U | U |
| 7 | D | D | D | D | D | D | D | D | X | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | X | X | X | X | X | U |
| 16 | D | X | X | X | X | X | X | X | X | X | X | X | X | X | 44 | D | D | D | D | D | X | X | X | X | X | X | U | U | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | X | U | D | D | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | D | X | X | U | D | D | D | D | X | X | U |
| 22 | D | X | X | X | X | X | X | X | X | X | X | X | U | U | 50 | D | D | X | X | U | U | U | D | D | X | X | U | U | U |
| 23 | D | D | X | X | X | X | X | X | X | X | X | X | U | U | 51 | D | X | X | U | U | U | U | D | X | X | U | U | U | U |
| 24 | D | D | D | X | X | X | X | X | X | X | X | X | U | U | 52 | D | X | X | X | X | U | D | X | X | X | X | X | U | U |
| 25 | D | X | X | X | X | X | X | X | X | X | U | U | U | U | 53 | D | D | X | X | X | U | D | D | X | X | X | X | U | U |
| 26 | D | X | X | X | X | X | X | X | X | U | U | U | U | U | 54 | X | X | X | X | X | X | D | D | D | D | D | D | D | D |
| 27 | D | D | D | X | X | X | X | X | X | X | X | U | U | U | 55 | D | D | X | X | X | U | U | D | D | D | D | D | D | D |
| 56~255 | | | | | | | | | | | | | | | | | | | | | Reserved | | | | | | | | |

In Table 1, D denotes a DL symbol, U denotes a UL symbol, and X denotes a flexible symbol. As shown in Table 1, up to two DL/UL switching in one slot may be allowed.

Figure 3:
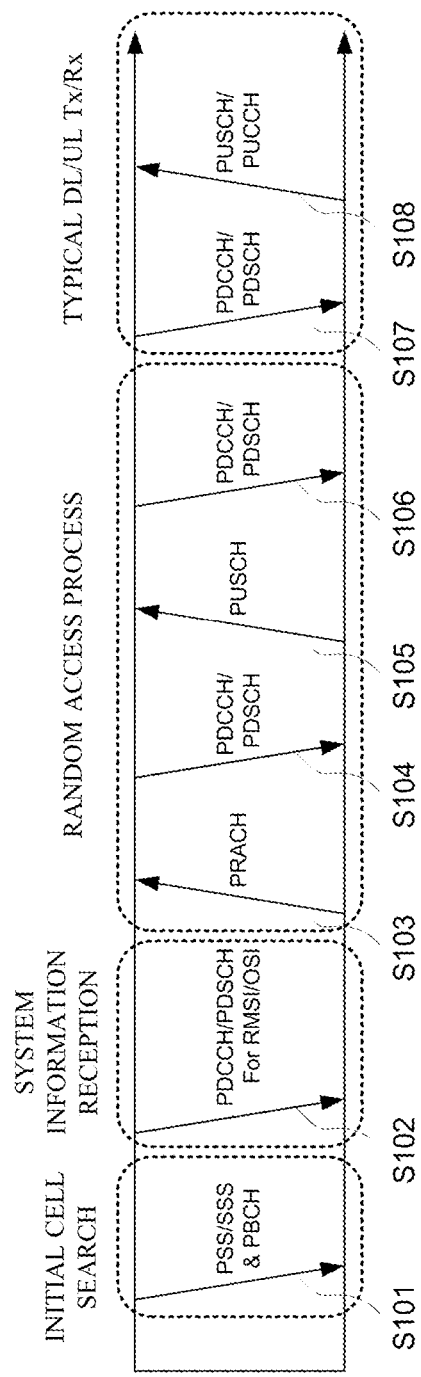
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell index. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

In a case where the UE initially accesses the base station or there is no radio resources for signal transmission (the UE is in an RRC_IDLE mode), the terminal may perform a random access process for the base station (operation S103 to operation S106). First, the UE may transmit a preamble through a physical random access channel (PRACH) (operation S103), and receive a random access response (RAR) message for the preamble from the base station through a PDCCH and a PDSCH corresponding thereto (operation S104). The preamble in operations S103 and S104 may be described as message 1 (Msg1) and the random access response may be described as a response message or message 2 (Msg2). When a valid random access response is received by the UE, the UE may transmit data including an identifier of the UE to the base station through a physical uplink shared channel (PUSCH) indicated in an uplink grant transferred from the base station through a PDCCH or PDSCH (operation S105). The data including the identifier of the UE and the PUSCH including the data in operation S105 may be described as message 3 (Msg3). In addition, the PUSCH including the data may be described as a message 3 PUSCH (Msg3 PUSCH). Next, the UE waits for receiving a PDCCH as an indication of the base station to resolve a collision. When the UE successfully receives a PDCCH through the identifier of the UE and receives a PDSCH corresponding thereto (operation S106), the random access process is terminated. The PDCCH and PDSCH in operation S106 may be described as message 4 (Msg4). The UE may obtain, on an RRC layer during the random access process, UE-specific system information required for the UE to correctly operate on a physical layer. When the UE acquires the UE-specific system information from the RRC layer, the UE enters an RRC_CONNECTED mode.

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
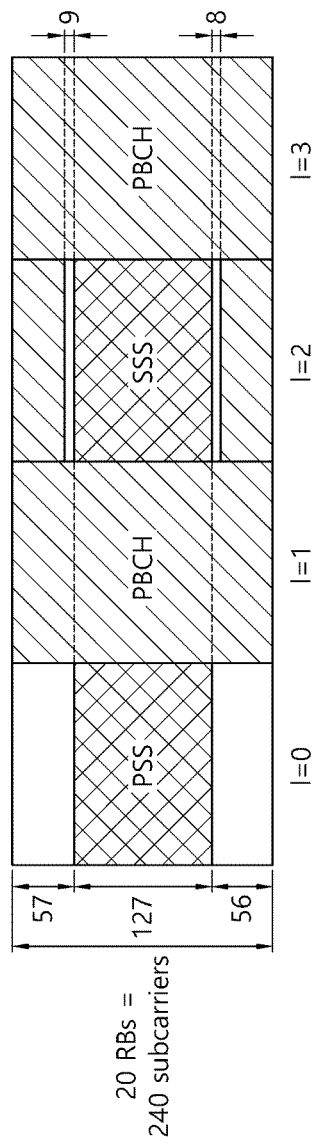
FIGS. 4a and 4b illustrates an SS/PBCH block for initial cell access in a 3GPP NR system.
Figure 4B:
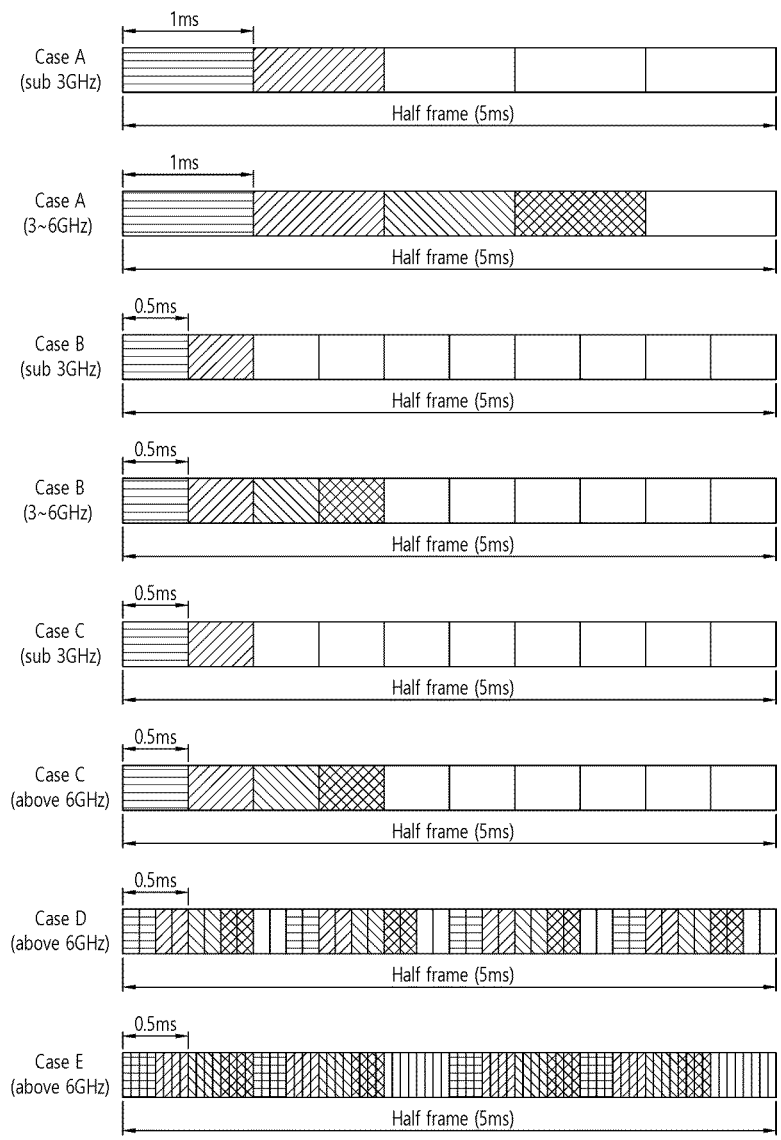

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/relative to the start of an SS/PBCH block | Subcarrier number k relative to the start of an SS/PBCH block |
|---|---|---|
| PSS | 0 | 56, 57, ..., 182 |
| SSS | 2 | 56, 57, ..., 182 |
| Set to 0 | 0 | 0, 1, ..., 55, 183, 184, ..., 239 |
|  | 2 | 48, 49, ..., 55, 183, 184, ..., 191 |
| PBCH | 1, 3 | 0, 1, ..., 239 |
|  | 2 | 0, 1, ..., 47, 192, 193, ..., 239 |
| DM-RS for PBCH | 1, 3 | 0 + v, 4 + v, 8 + v, ..., 236 + v 0 + v, 4 + v, 8 + v, ..., 44 + v |
| PBCH | 2 | 192 + v, 196 + v ..., 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N_{ID}^{(2)}) \bmod 127$$

$$0 \le n < 127$$

Here, $x(i + 7) = (x(i + 4) + x(i)) \bmod 2$ and is given as $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127][1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

$$x_0(i + 7) = (x_0(i + 4) + x_0(i)) \bmod 2$$

Here, $x_1(i + 7) = (x_1(i + 1) + x_1(i)) \bmod 2$ and is given as $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHZ. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
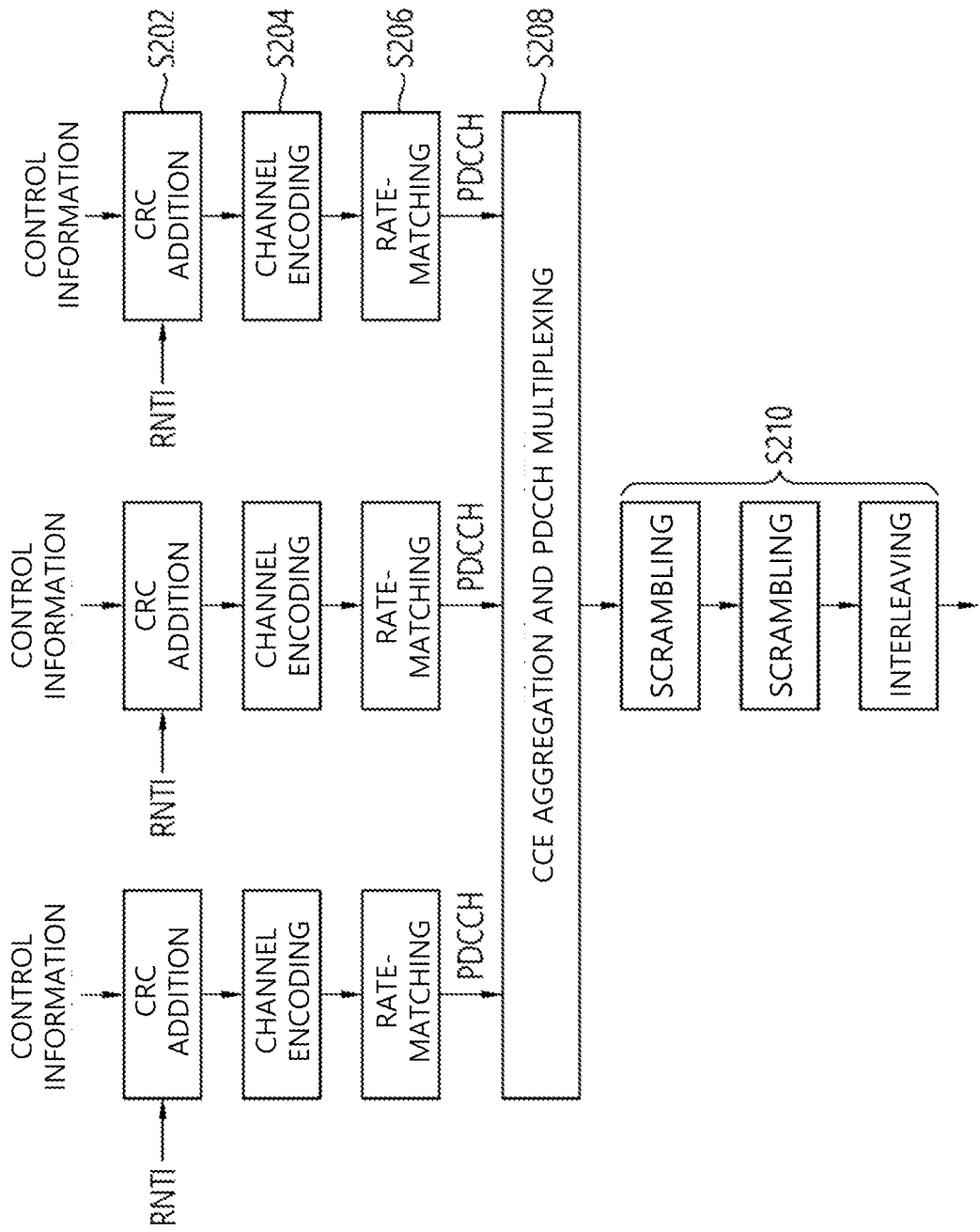
FIGS. 5a and 5b illustrates a procedure for transmitting control information and a control channel in a 3GPP NR system.
Figure 5B:
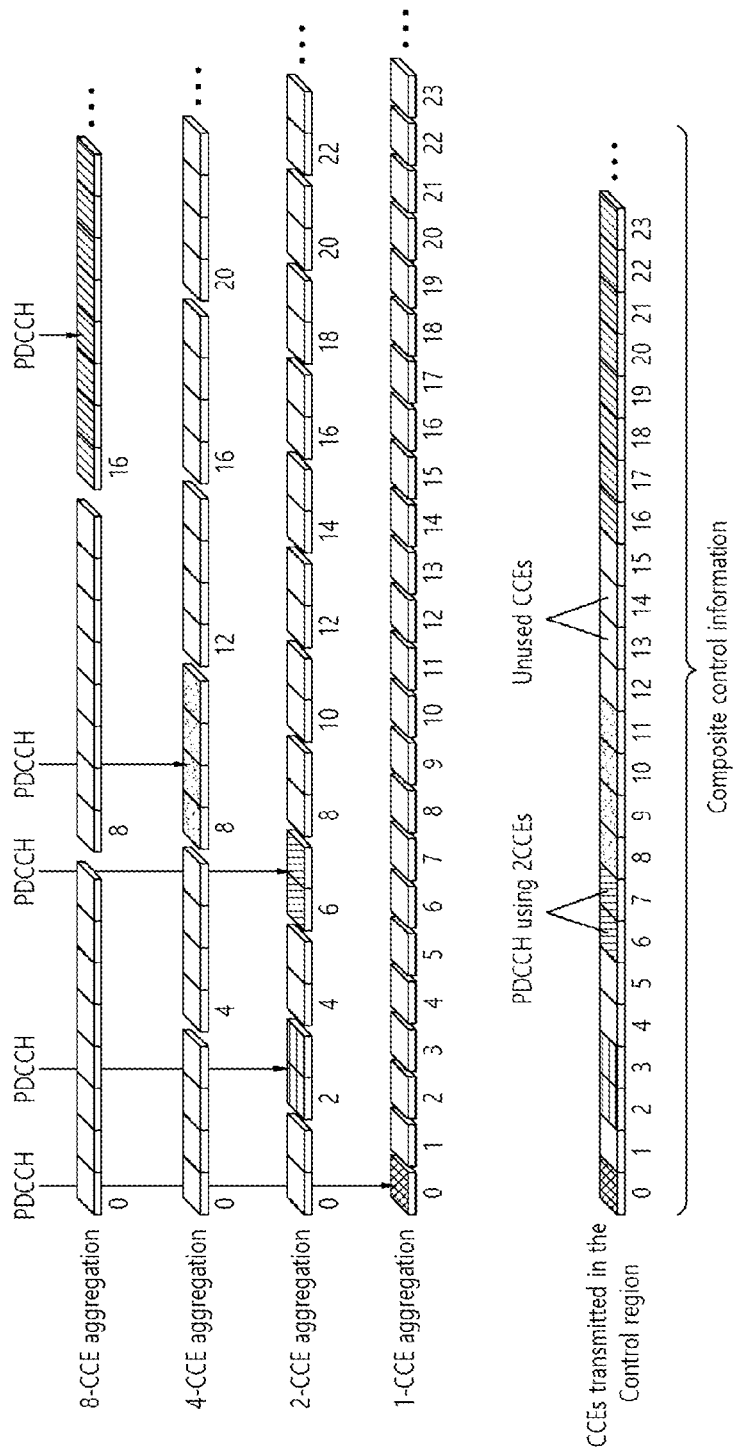

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
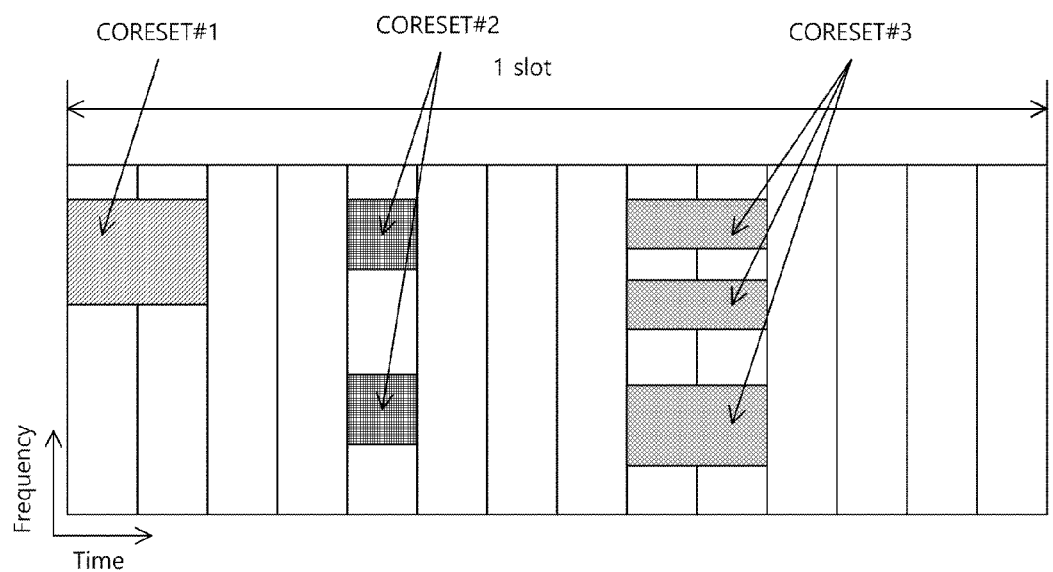
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 6, CORESET #1 starts at the first symbol of the slot, CORESET #2 starts at the fifth symbol of the slot, and CORESET #9 starts at the ninth symbol of the slot.

Figure 7:
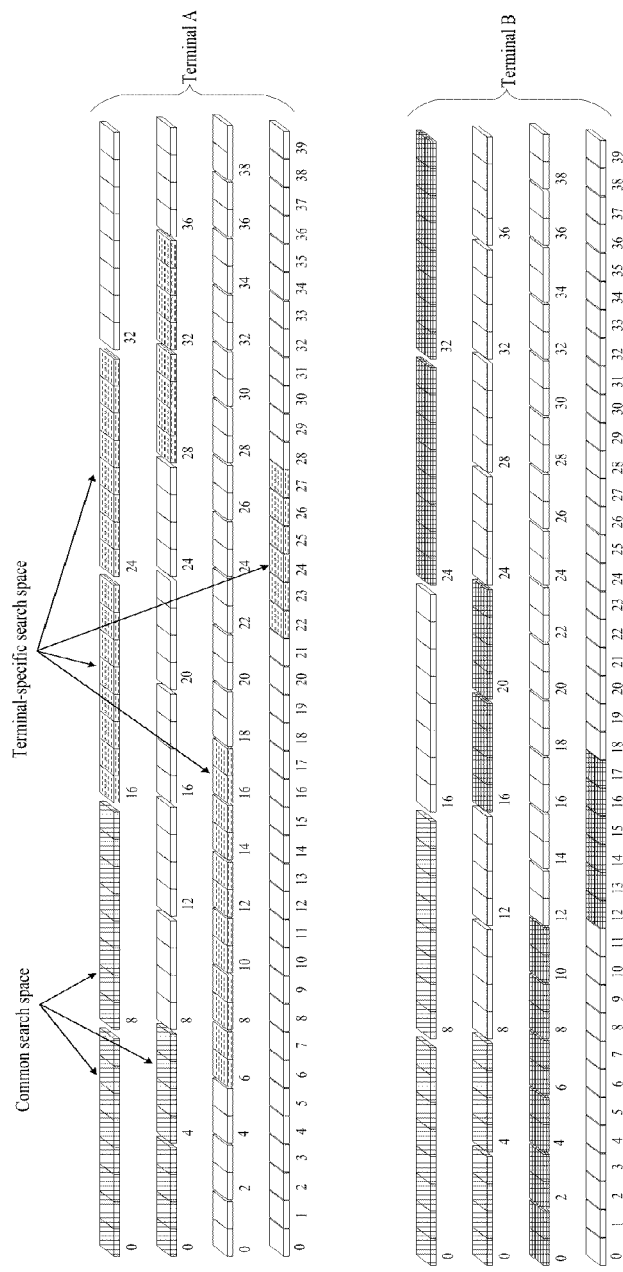
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present invention, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).
 Scheduling Request (SR): Information used for requesting a UL UL-SCH resource.
 HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.
 Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}=1$ or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}=1$, 1 bit UCI 0 and 1 may be mapped to two cyclic shifted sequences having a difference of 6 in the cyclic shift value, respectively. In addition, when $M_{bit}=2$, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}=1$, may be BPSK-modulated. The UE may modulate UCI, which is $M_{bit}=2$, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling (N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
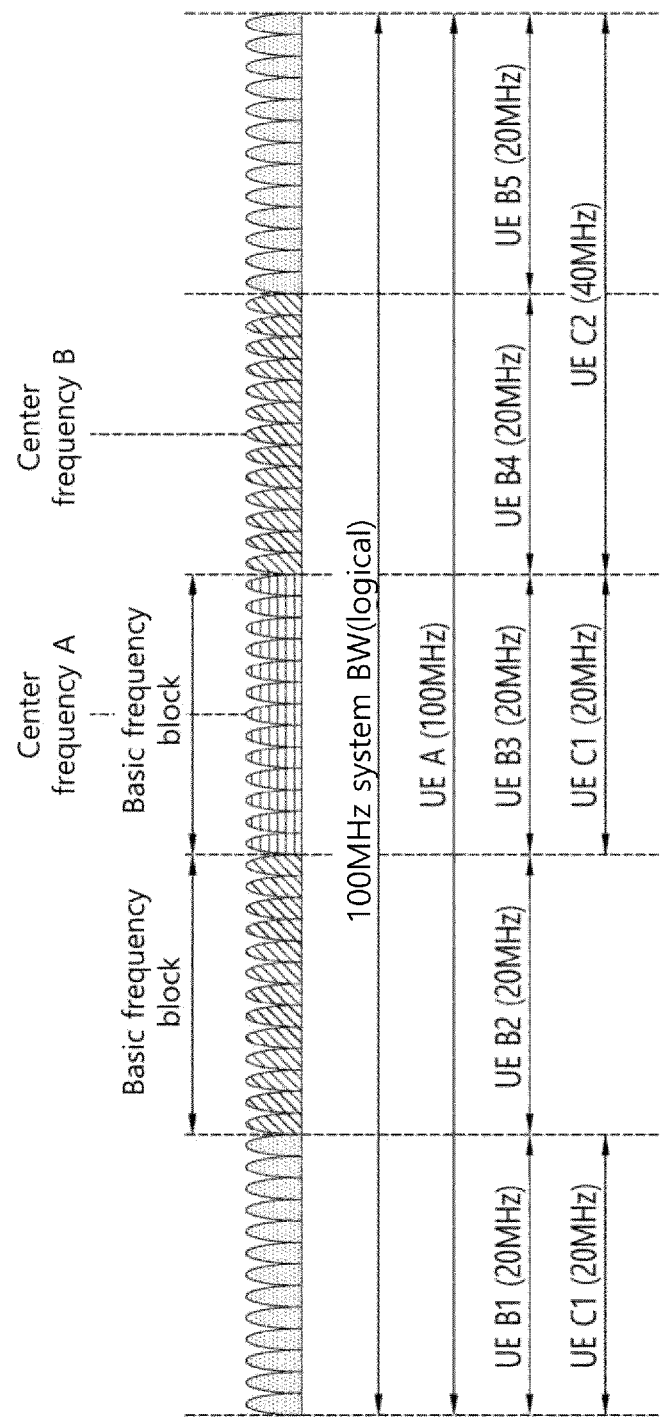
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHZ. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
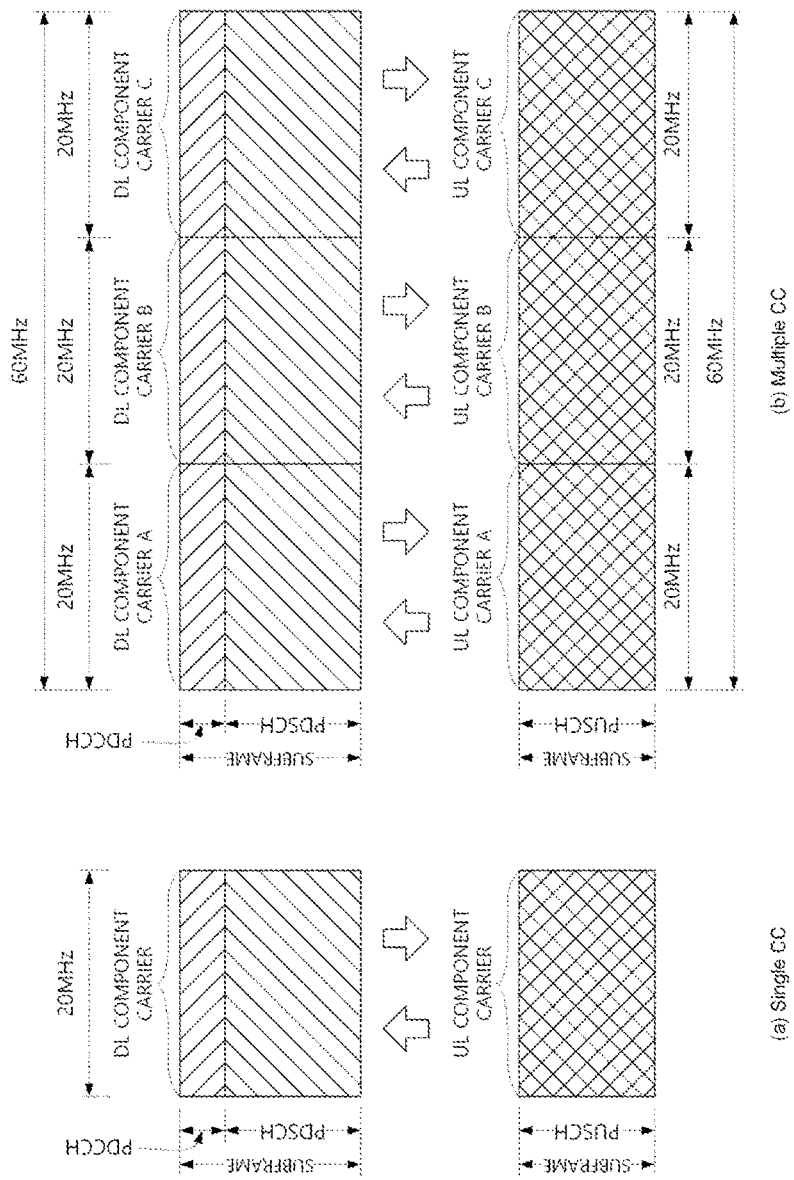
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present invention, a cell of a carrier aggregation is referred to as a CC, and a cell of a geographical area is referred to as a cell.

Figure 10:
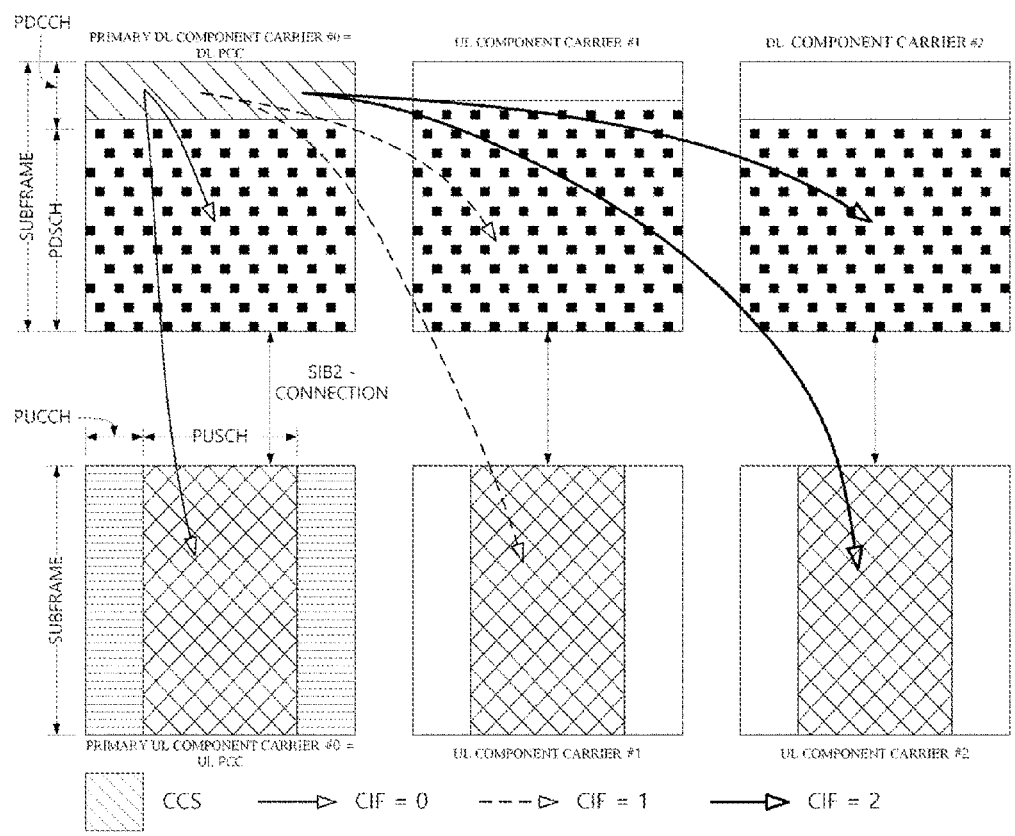
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
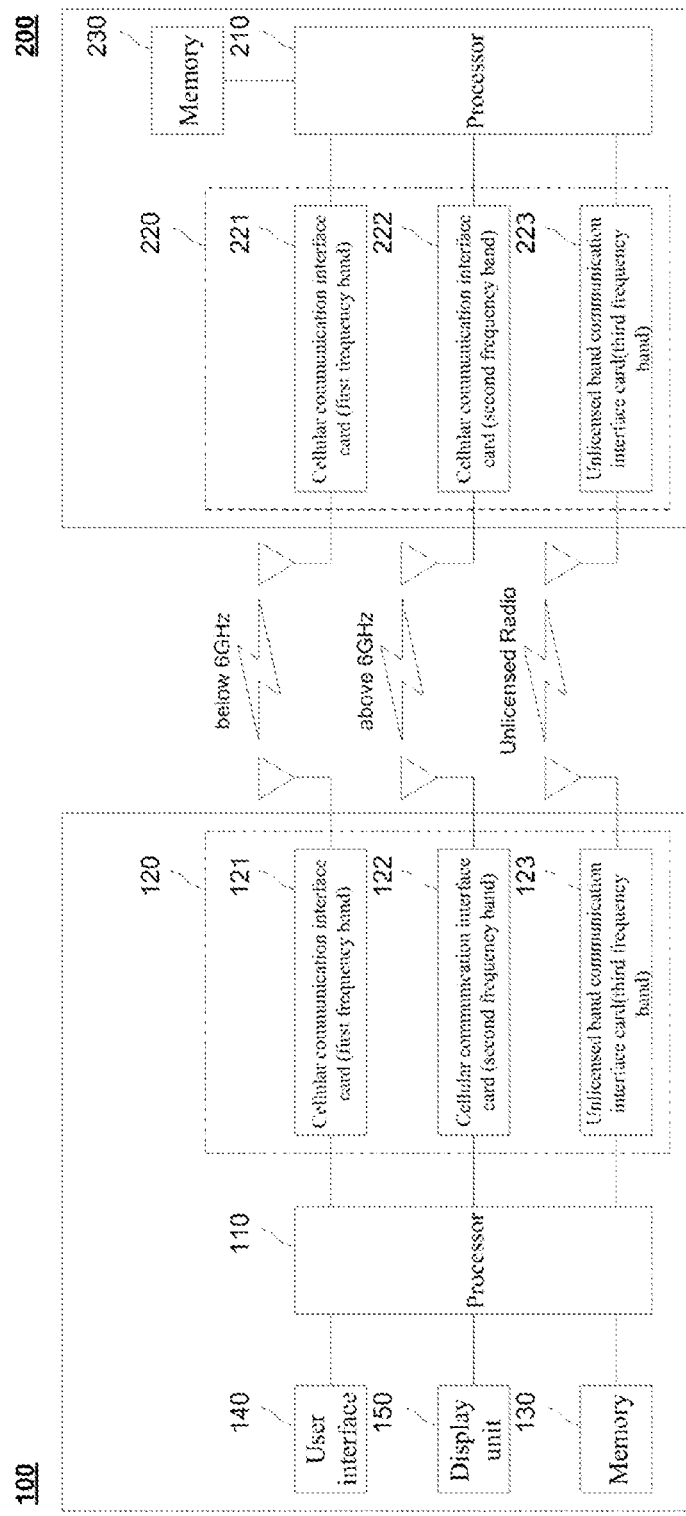
FIG. 11 is a block diagram showing the configurations of a UE and a base station according to an embodiment of the present invention.

FIG. 11 is a block diagram showing the configurations of a UE and a base station according to an embodiment of the present invention.

In an embodiment of the present invention, a terminal may be implemented as various types of wireless communication devices or computing devices which ensure portability and mobility. The terminal may be called a user equipment (UE), a station (STA), a mobile subscriber (MS), or the like. In addition, in an embodiment of the present invention, a base station may control and manage a cell (e.g., a macro cell, a femto cell, or a pico cell) corresponding to a service area, and perform a function such as signal broadcasting, channel designation, channel monitoring, self-diagnosis, and relaying. The base station may be called a next generation nodeB (gNB) or an access point (AP).

As illustrated, a terminal 100 according to an embodiment of the present invention may include a processor 110, a communication module 120, a memory 130, a user interface unit 140, and a display unit 150.

First, the processor 110 may execute various commands or programs, and process data in the terminal 100. In addition, the processor 110 may control the entire operation including each unit of the terminal 100, and control data transmission or reception between units. The processor 110 may be configured to perform an operation according to an embodiment described in the present invention. For example, the processor 110 may receive slot configuration information, determine the configuration of a slot on the basis of the information, and perform communication according to the determined slot configuration.

Next, the communication module 120 may be an integrated module that performs wireless communication using a wireless communication network and wireless LAN access using a wireless LAN. To this end, the communication module 120 may include multiple network interface cards (NICs), such as cellular communication interface cards 121 and 122 and an unlicensed band communication interface card 123, in an internal or external type. In the diagram, the communication module 120 is illustrated as an integrated module. However, each of the network interface cards may be independently disposed unlike the diagram according to a circuit configuration or usage.

The cellular communication interface card 121 may transmit or receive a wireless signal to or from at least one of a base station 200, an external device, and a server by using a mobile communication network, and provide a cellular communication service using a first frequency band on the basis of a command of the processor 110. According to an embodiment, the cellular communication interface card 121 may include at least one NIC module using a frequency band lower than 6 GHz. The at least one NIC module of the cellular communication interface card 121 may independently perform cellular communication with at least one of the base station 200, an external device, and a server according to a cellular communication specification or protocol for a frequency band lower than 6 GHz supported by the NIC module.

The cellular communication interface card 122 may transmit or receive a wireless signal to or from at least one of the base station 200, an external device, and a server by using a mobile communication network, and provide a cellular communication service using a second frequency band on the basis of a command of the processor 110. According to an embodiment, the cellular communication interface card 122 may include at least one NIC module using a frequency band of 6 GHz or higher. The at least one NIC module of the cellular communication interface card 122 may independently perform cellular communication with at least one of the base station 200, an external device, and a server according to a cellular communication specification or protocol for a frequency band of 6 GHz or higher supported by the NIC module.

The unlicensed band communication interface card 123 may transmit or receive a wireless signal to or from at least one of the base station 200, an external device, and a server by using a third frequency band that is an unlicensed band, and provide a communication service of an unlicensed band on the basis of a command of the processor 110. The unlicensed band communication interface card 123 may include at least one NIC module using an unlicensed band. For example, the unlicensed band may be a band equal to or higher than of 2.4 GHz, 5 GHZ, 6 GHZ, 7 GHz, or 52.6 GHz. The at least one NIC module of the unlicensed band communication interface card 123 may independently or dependently perform wireless communication with at least one of the base station 200, an external device, and a server according to an unlicensed band communication specification or protocol for a frequency band supported by the NIC module.

Next, the memory 130 stores a control program used in the terminal 100 and various relevant data. The control program may include a predetermined program required for the terminal 100 to perform wireless communication with at least one of the base station 200, an external device, and a server.

Next, the user interface 140 includes various types of input/output means provided in the terminal 100. That is, the user interface 140 may receive a user input by using various input means, and the processor 110 may control the terminal 100 on the basis of the received user input. Moreover, the user interface 140 may perform an output based on a command of the processor 110 by using various output means.

Next, the display unit 150 outputs various images on a display screen. The display unit 150 may output various display objects, such as content executed by the processor 110, or a user interface based on a control command of the processor 110.

In addition, the base station 200 according to an embodiment of the present invention may include a processor 210, a communication module 220, and a memory 230.

First, the processor 210 may execute various commands or programs, and process data in the base station 200. In addition, the processor 210 may control the entire operation including each unit of the base station 200, and control data transmission or reception between units. The processor 210 may be configured to perform an operation according to an embodiment described in the present invention. For example, the processor 210 may perform signaling of slot configuration information, and perform communication according to the signaled slot configuration.

Next, the communication module 220 may be an integrated module that performs wireless communication using a wireless communication network and wireless LAN access using a wireless LAN. To this end, the communication module 220 may include multiple network interface cards, such as cellular communication interface cards 221 and 222 and an unlicensed band communication interface card 223, in an internal or external type. In the diagram, the communication module 220 is illustrated as an integrated module. However, each of the network interface cards may be independently disposed unlike the diagram according to a circuit configuration or usage.

The cellular communication interface card 221 may transmit or receive a wireless signal to or from at least one of the terminal 100, an external device, and a server by using a mobile communication network, and provide a cellular communication service using a first frequency band on the basis of a command of the processor 210. According to an embodiment, the cellular communication interface card 221 may include at least one NIC module using a frequency band lower than 6 GHz. The at least one NIC module of the cellular communication interface card 221 may independently perform cellular communication with at least one of the terminal 100, an external device, and a server according to a cellular communication specification or protocol for a frequency band lower than 6 GHz supported by the NIC module.

The cellular communication interface card 222 may transmit or receive a wireless signal to or from at least one of the terminal 100, an external device, and a server by using a mobile communication network, and provide a cellular communication service using a second frequency band on the basis of a command of the processor 210. According to an embodiment, the cellular communication interface card 222 may include at least one NIC module using a frequency band of 6 GHz or higher. The at least one NIC module of the cellular communication interface card 222 may independently perform cellular communication with at least one of the terminal 100, an external device, and a server according to a cellular communication specification or protocol for a frequency band of 6 GHz or higher supported by the NIC module.

The unlicensed band communication interface card 223 may transmit or receive a wireless signal to or from at least one of the terminal 100, an external device, and a server by using a third frequency band that is an unlicensed band, and provide a communication service of an unlicensed band on the basis of a command of the processor 210. The unlicensed band communication interface card 223 may include at least one NIC module using an unlicensed band. For example, the unlicensed band may be a band equal to or higher than of 2.4 GHz, 5 GHZ, 6 GHZ, 7 GHZ, or 52.6 GHz. The at least one NIC module of the unlicensed band communication interface card 223 may independently or dependently perform wireless communication with at least one of the terminal 100, an external device, and a server according to an unlicensed band communication specification or protocol for a frequency band supported by the NIC module.

The terminal 100 and the base station 200 illustrated in FIG. 11 are expressed in a block diagram according to an embodiment of the present invention, and separated blocks are illustrated to logically distinguish between the elements of a device. Therefore, the elements of a device may be mounted as a single chip or multiple chips according to the design of the device. In addition, a partial configuration of the terminal 100, for example, the user interface 140 and the display unit 150, may be optionally included in the terminal 100. In addition, the user interface 140 and the display unit 150 may be additionally included in the base station 200 as necessary.

Hereinafter, with reference to FIG. 12 and FIG. 13, a method of receiving a physical downlink control channel and a physical downlink shared channel by a terminal and a method of transmitting a physical uplink control channel and a physical uplink shared channel are described.

A terminal may receive a physical downlink control channel transmitted from a base station, and information such as a control resource set (CORESET) or a search space may be configured for the terminal to receive the downlink control channel.

A control resource set includes information of a frequency area in which a physical downlink control channel is required to be received. More specifically, information of a control resource set may include the index of a PRB or PRB sets in which the terminal is required to receive a physical downlink control channel, and the number of consecutive symbols. The number of consecutive symbols is one of 1, 2, and 3.

A search space includes time information on a time at which a set of PRBs indicated by the control resource set is required to be received. More specifically, information of a search space may include information of at least one of a period (periodicity) and an offset. The period (periodicity) or offset may be indicated by a unit of slots, sub-slots, symbols, symbol sets, or slot sets. Additionally, information of a search space may include a CCE aggregation level received by the terminal, the number of PDCCH monitored every CCE aggregation level, a search space type, or a DCI format or RNTI information that is monitored.

A CCE aggregation level has at least one value among 1, 2, 4, 8, and 16. The terminal may monitor a PDCCH on control channel elements (CCEs), the number of which is equal to the value of a CCE aggregation level.

A search space type may be a common search space (CSS) and a terminal-specific search space (UE-specific search space). A common search space means a search space in which all the terminal of a cell or some terminals of the cell commonly monitor a PDCCH. The terminal may monitor and receive, in the search space, PDCCH candidates that are broadcast to all the terminal of a cell or some terminals of the cell (e.g., the PDCCH is a PDCCH transferring DCI having a CRC scrambled by at least one RNTI among an SI-RNTI, an RA-RNTI, an MsgB-RNTI, a P-RNTI, a TC-RNTI, an INT-RNTI, an SFI-RNTI, a TPC-PUSCH-RNTI, a TPC-PUCCH-RNTI, a TPC-SRS-RNTI, a CI-RNTI, a C-RNTI, an MCS-C-RNTI, a CS-RNTI(s), or a PS-RNTI). The terminal may monitor and receive, in a terminal-specific search space, PDCCH candidates that is transmitted to individual terminals (e.g., the PDCCH is a PDCCH transferring DCI having a CRC scrambled by at least one RNTI among a C-RNTI, an MCS-C-RNTI, an SP-CSI-RNTI, a CS-RNTI(s), an SL-RNTI, an SL-CS-RNTI, or an SL-L-CS-RNTI). In addition, the terminal may receive a PDCCH transferring DCI indicating reception of a physical downlink shared channel, transmission of a physical uplink control channel, or transmission of a physical uplink shared channel in a common search space and a terminal-specific search space.

A DCI format monitored by the terminal scheduled by the base station to transmit a physical uplink shared channel and receive a physical downlink shared channel may be DCI format 0_0, 0_1, 0_2, 1_0, 1_1, or 1_2. RNTI information may include at least one RNTI among a CS-RNTI, an MCS-C-RNTI, and a C-RNTI in a case of DCI format 0_0, 0_1, 0_2, 1_0, 1_1, or 1_2. The CS-RNTI may be used by the base station to schedule activation/release or retransmission of a semi-persistent (SPS) PDSCH or a configured grant (CG) PUSCH, and may also be used by the terminal to receive same. The MCS-C-RNTI may be used by the base station to schedule a PDSCH or PUSCH using a modulation and coding scheme (MCS) having high reliability, and may be used by the terminal to receive same. The C-RNTI may be used by the base station to schedule a PDSCH or PUSCH and may be used by the terminal to receive same.

In addition, a DCI format which may be included in a PDCCH monitored by the terminal may additionally include at least the followings.

DCI format 2_0 includes a dynamic slot format indicator (SFI) information indicating the direction of a symbol of a slot to be an uplink, downlink, or flexible symbol. An RNTI used for DCI format 2_0 is an SFI-RNTI.

DCI format 2_1 includes a DL preemption indication (or interrupted transmission indication) indicating that there is no downlink transmission toward the terminal from the base station on PRB(s) and symbol(s). An RNTI used for DCI format 2_1 is an INT-RNTI.

DCI format 2_4 represents a UL cancellation indication indicating canceling of uplink transmission by the terminal on PRB(s) and symbol(s). An RNTI used for DCI format 2_4 is a CI-RNTI.

The terminal may determine a PDCCH candidate on which a PDCCH needs to be received, through information of a configured control resource set and search space. The terminal may monitor the PDCCH candidate, check a CRC through an RNTI value, and then determine whether a correct PDCCH has been received. The RNTI value may include an SFI-RNTI, INT-RNTI, and CI-RNTI value in addition to at least a C-RNTI, an MCS-C-RNTI, and a CS-RNTI.

If the terminal receives a correct PDCCH, the terminal may interpret downlink control information (DCI) transferred by the PDCCH on the basis of the information of the control resource set and search space, and perform an operation indicated in the DCI. The DCI may include one of DCI format 0_0, 0_1, and 0_2 scheduling a physical uplink shared channel (PUSCH). The DCI may include one of DCI format 1_0, 1_1, and 1_2 scheduling a physical downlink shared channel (PDSCH). The DCI may include one of DCI format 1_0, 1_1, and 1_2 scheduling a physical uplink control channel (PUCCH). For reference, the PUCCH may include a PUCCH transmitting a HARQ-ACK. In addition, the DCI may include DCI format 2_0, 2_1, or 2_4.

In a case where the terminal receives DCI format 1_0, 1_1, or 1_2 scheduling a physical downlink shared channel (PDSCH), the terminal needs to receive a downlink shared channel scheduled by a DCI format. To this end, the terminal is required to interpret (determine), through a DCI format, a slot on which a physical downlink shared channel is scheduled and the start index and length of symbols in the slot. A time domain resource assignment (TDRA) field of DCI format 1_0, 1_1, or 1_2 may indicate a K0 value that is timing information of a scheduled slot, and a starting length indicator value (SLIV) that is the index of a starting symbol in the slot and a length. Here, the value of K0 may be an integer value that is not negative. Here, a SLIV may be a value obtained by joint encoding of the value of the index(s) of a starting symbol in a slot and the value of a length (L). In addition, a SLIV may separately transmit the value of the index(s) of a starting symbol in a slot and the value of a length (L). S may have one value among 0, 1, . . . , and 13 in a case of a normal CP, and L may have one value among natural numbers satisfying a condition that S+L is smaller or equal to 14. S may have one value among 0, 1, . . . , and 11 in a case of an extended CP, and L may have one value among natural numbers satisfying a condition that S+L is smaller or equal to 12.

The terminal may determine a slot on which a physical downlink shared channel (PDSCH) needs to be received, on the basis of the K0 value. More specifically, the terminal may determine a slot on which a physical downlink shared channel needs to be received, on the basis of a K0 value, the index of a slot on which the DCI is received, the subcarrier spacing (SCS) of a downlink BWP in which the DCI is received, or the subcarrier spacing of a downlink BWP in which the scheduled downlink shared channel is received.

For example, there is an assumption that a downlink BWP in which the DCI is received and a downlink BWP in which a scheduled physical downlink shared channel (PDSCH) is received have the same subcarrier spacing. The DCI is assumed as having been received on downlink slot n. In this case, the downlink shared channel (PDSCH) is required to be received on downlink slot n+k0.

For example, there is an assumption that the subcarrier spacing of a downlink BWP in which the DCI is received is 15 kHz*2^mu_PDCCH and the subcarrier spacing of a downlink BWP in which a scheduled physical downlink shared channel (PDSCH) is received is 15 kHz*2^mu_PDSCH. The DCI is assumed as having been received on downlink slot n. The index of downlink slot n is an index based on the subcarrier spacing of the downlink BWP in which the DCI is received. In this case, the physical downlink shared channel is required to be received on slot floor (n*2^mu_PDSCH/2^mu_PDCCH)+K0. The index of the downlink slot, floor (n*2^mu_PDSCH/2^mu_PDCCH)+K0, is an index based on the subcarrier spacing of the downlink BWP in which the physical downlink shared channel is received. In the above description, mu_PDCCH or mu_PDSCH may have a value of 0, 1, 2, or 3.

Figure 12:
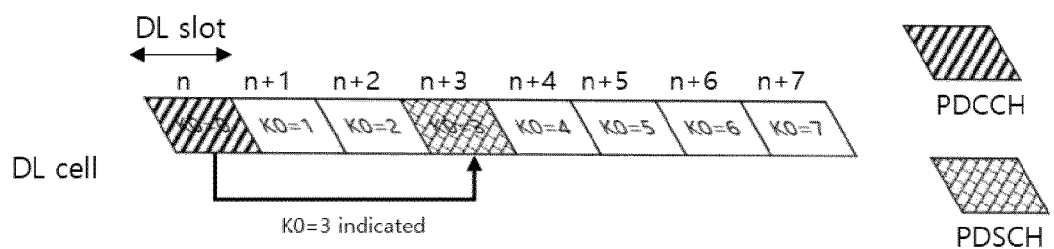
FIG. 12 is a diagram illustrating scheduling of a physical downlink shared channel (PDSCH) according to an embodiment of the present invention.

FIG. 12 is a diagram illustrating scheduling of a physical downlink shared channel (PDSCH) according to an embodiment of the present invention.

Referring to FIG. 12, a PDSCH may be scheduled for a terminal through a particular format of DCI of a PDCCH.

Specifically, as illustrated in FIG. 12, the terminal may receive a PDCCH scheduling a physical downlink shared channel (PDSCH) on downlink slot n. K0 of DCI transferred through the PDCCH is assumed to indicate 3. In addition, the subcarrier spacing of a DL BWP in which the PDCCH is received and the subcarrier spacing of a DL BWP in which the PDSCH is scheduled are assumed to be the same. In this case, the terminal may determine that the PDSCH is scheduled on downlink slot n+K0, that is, slot n+3.

The terminal may determine a symbol on which the downlink shared channel (PDSCH) needs to be received, in a slot on which the physical downlink shared channel (PDSCH) needs to be received, on the basis of the K0 value, by using a length (L) and the index(S) of a starting symbol in the slot. The symbol on which the physical downlink shared channel (PDSCH) needs to be received corresponds to symbol S to symbol S+L−1 in the slot obtained on the basis of the K0 value. For reference, symbol S to symbol S+L−1 are L consecutive symbols.

A downlink slot aggregation may be additionally configured for the terminal by a base station. A downlink slot aggregation value may be 2, 4, and 8. When a downlink slot aggregation is configured, the terminal is required to receive a physical downlink shared channel (PDSCH) on consecutive slots corresponding to the slot aggregation value from the slot obtained on the basis of the K0 value.

In a case where the terminal has received DCI format 1_0, 1_1, or 1_2 scheduling a physical uplink control channel, the terminal needs to transmit the scheduled uplink control channel. The physical uplink control channel may include HARQ-ACK information. A PDSCH-to-HARQ feedback timing indicator field included in DCI format 1_0, 1_1, or 1_2 may indicate a K1 value that is a value for information of a slot on which a scheduled uplink control channel needs to be transmitted. Here, the value of K1 may be an integer value that is not negative. The K1 value of DCI format 1_0 may indicate one value among 0, 1, 2, 3, 4, 5, 6, and 7. A K1 value indicatable in DCI format 1_1 or 1_2 may be configured or set from a higher layer.

The HARQ-ACK information may be HARQ-ACK information relating to whether two types of channels have been successfully received. As a first type, if a physical downlink shared channel (PDSCH) is scheduled through the DCI format 1_0, 1_1, or 1_2, the HARQ-ACK information may be a HARQ-ACK relating to whether the physical downlink shared channel (PDSCH) has been successfully received. As a second type, if the DCI format 1_0, 1_1, or 1_2 is DCI indicating release of a semi-static physical downlink shared channel (SPS PDSCH), the HARQ-ACK information may be a HARQ-ACK relating to whether the DCI format 1_0, 1_1, or 1_2 has been successfully received.

The terminal may determine a slot on which an uplink control channel including first type HARQ-ACK information is transmitted, as follows. The terminal may determine an uplink slot overlapping with the last symbol of a physical downlink shared channel (PDSCH) corresponding to the HARQ-ACK information. When the index of the uplink slot is m, an uplink slot on which the terminal transmits a physical uplink control channel including the HARQ-ACK information may be m+K1. The index of the uplink slot is a value based on the subcarrier spacing of an uplink BWP in which the uplink control channel is transmitted.

For reference, when a downlink slot aggregation is configured for the terminal, the ending symbol indicates the last symbol of a PDSCH scheduled in the last slot among slots on which a physical downlink shared channel (PDSCH) is received.

Figure 13:
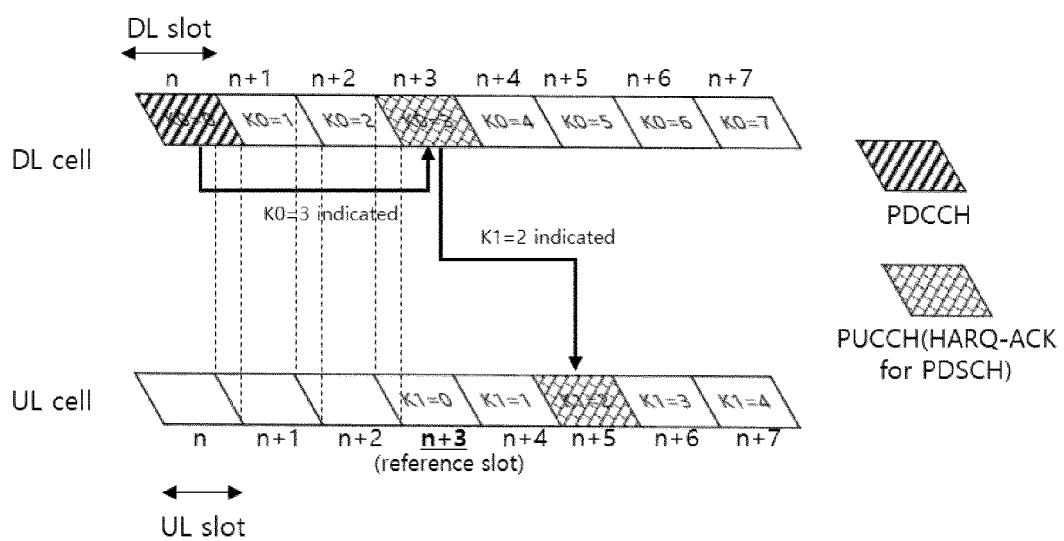
FIG. 13 is a diagram illustrating scheduling of a physical uplink control channel (PUCCH) according to an embodiment of the present invention.

FIG. 13 is a diagram illustrating scheduling of a physical uplink control channel (PUCCH) according to an embodiment of the present invention.

Referring to FIG. 13, a terminal may receive scheduling information for a PDSCH and transmission of a PUCCH through DCI of a PDCCH, and receive the PDSCH and transmit the PUCCH on the basis of the received DCI.

Specifically, as illustrated in FIG. 13, the terminal may receive a PDCCH scheduling a downlink shared channel (PDSCH) on downlink slot n. DCI transferred from the PDCCH may include scheduling information for reception of a PDSCH and transmission of a PUCCH. For example, if the value of K0 included in the DCI is "3", the value of K1 is "2", and the subcarrier spacing of a DL BWP in which the PDCCH is received, the subcarrier spacing of a DL BWP in which the PDSCH is scheduled, and the subcarrier spacing of a UL BWP in which the PUCCH is transmitted are the same, the terminal may determine that the PDSCH is scheduled on downlink slot n+K0, that is, slot N+3. In addition, the terminal may determine an uplink slot overlapping with the last symbol of the PDSCH scheduled on downlink slot n+3. The last symbol of the PDSCH of downlink slot n+3 overlaps with uplink slot n+3. Therefore, the terminal transmits the PUCCH on uplink slot n+3+K1, that is, slot n+5.

The terminal may determine a slot on which a physical uplink control channel including two types of HARQ-ACK information is transmitted, as follows. The terminal may determine an uplink slot overlapping with the ending symbol of a physical downlink control channel (PDCCH) corresponding to the HARQ-ACK information. When the index of the uplink slot is m, a slot on which the terminal transmits an uplink control channel including the HARQ-ACK information may be m+K1. The index of the uplink slot is a value based on the subcarrier spacing of an uplink BWP in which the physical uplink control channel (PUCCH) is transmitted.

Figure 14:
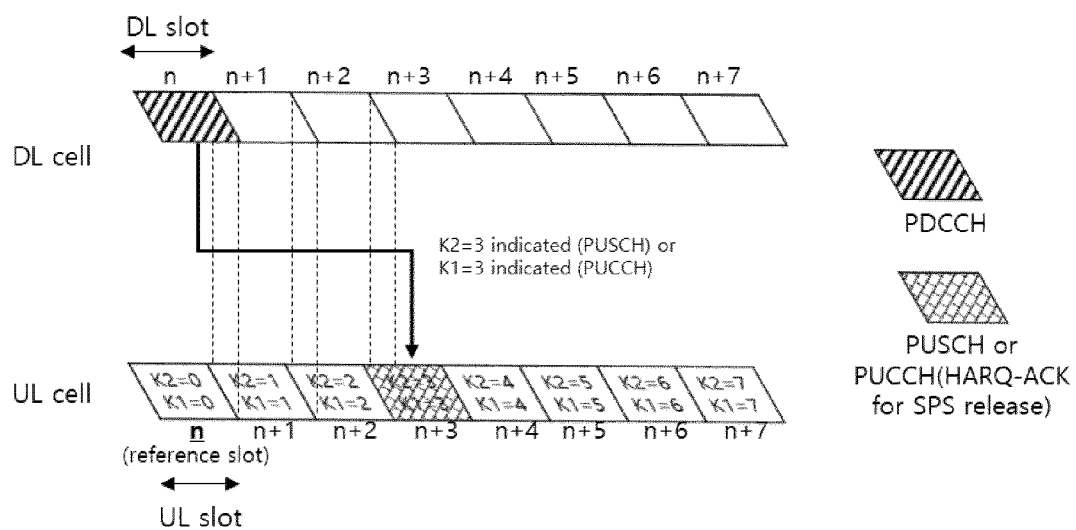
FIG. 14 is a diagram illustrating scheduling of a physical uplink shared channel and a physical uplink control channel according to an embodiment of the present invention.

FIG. 14 is a diagram illustrating scheduling of a physical uplink shared channel and a physical uplink control channel according to an embodiment of the present invention.

Referring to FIG. 14, a terminal may receive scheduling information for transmission of a PUSCH and a PUCCH through DCI of a PDCCH, and transmit the PUSCH and transmit the PUCCH on the basis of the received DCI.

As illustrated in FIG. 14, the terminal may receive a PDCCH transferring SPS PDSCH release DCI on downlink slot n. If K1 of the DCI transferred from the PDCCH indicates "3", and the subcarrier spacing of a DL BWP in which the PDCCH is received and the subcarrier spacing of a UL BWP in which the PUCCH is transmitted are the same, the terminal may determine an uplink slot overlapping with the last symbol of the PDCCH on downlink slot n. In this case, the terminal may determine that a PUCCH transferring an HARQ-ACK of the SPS PDSCH release DCI is scheduled on uplink slot n+K1, that is, n+3.

If the terminal has received DCI format 0_0, 0_1, or 0_2 scheduling a physical uplink shared channel, the terminal needs to transmit the scheduled uplink shared channel. To this end, the terminal is required to interpret (determine), through the DCI, a slot on which the physical uplink shared channel is scheduled and the starting index and length of symbols in the slot. A time domain resource assignment (TDRA) field of the DCI format 0_0, 0_1, or 0_2 may indicate a K2 value that is a value for information of a scheduled slot, and a starting length indicator value (SLIV) that is a value for information of the index of a starting symbol in the slot and a length. Here, the value of K2 may be an integer value that is not negative. Here, a SLIV may be a value obtained by joint encoding of the value of the index(s) of a starting symbol in a slot and the value of a length (L). In addition, a SLIV may separately transmit the value of the index(s) of a starting symbol in a slot and the value of a length (L). S may have one value among 0, 1, . . . , and 13 in a case of a normal CP, and L may have one value among natural numbers satisfying a condition that S+L is smaller or equal to 14. S may have one value among 0, 1, . . . , and 11 in a case of an extended CP, and L may have one value among natural numbers satisfying a condition that S+L is smaller or equal to 12.

The terminal may determine a slot on which a physical uplink shared channel (PUSCH) needs to be transmitted, on the basis of the K2 value. More specifically, the terminal may determine a slot on which a physical uplink shared channel (PUSCH) needs to be transmitted, on the basis of a K2 value, the index of a slot on which the DCI is received, the subcarrier spacing of a downlink BWP in which the DCI is received, or the subcarrier spacing of an uplink BWP in which the uplink shared channel is transmitted.

For example, there is an assumption that a downlink BWP in which the DCI is received and an uplink BWP in which a scheduled physical uplink shared channel (PUSCH) is transmitted have the same subcarrier spacing. The DCI is assumed as having been received on downlink slot n. In this case, the uplink shared channel (PUSCH) is required to be transmitted on uplink slot n+K2.

For example, there is an assumption that the subcarrier spacing of a downlink BWP in which the DCI is received is 15 kHz*2^mu_PDCCH and the subcarrier spacing of an uplink BWP in which a scheduled physical uplink shared channel (PUSCH) is received is 15 kHz*2^mu_PUSCH. The DCI is assumed as having been received on downlink slot n. The index of downlink slot n is an index based on the subcarrier spacing of the downlink BWP in which the DCI is received. In this case, the physical uplink shared channel (PUSCH) is required to be transmitted on slot floor (n*2^mu_PUSCH/2^mu_PDCCH)+K2. The index of the uplink slot, floor (n*2^mu_PUSCH/2^mu_PDCCH)+K2, is an index based on the subcarrier spacing of the uplink BWP in which the uplink shared channel is transmitted. In the above description, mu_PDCCH or mu_PUSCH may have a value of 0, 1, 2, or 3.

As illustrated in FIG. 14, the terminal may receive a PDCCH scheduling a physical uplink shared channel (PUSCH) on downlink slot n. If the value of K2 is "3" according to DCI transferred from the PDCCH, and the subcarrier spacing of a DL BWP in which the PDCCH is received and the subcarrier spacing of a UL BWP in which the PUCCH is transmitted are the same, the terminal may determine that the PUSCH is scheduled on uplink slot n+K2=n+3.

The terminal may determine a symbol on which the uplink shared channel (PUSCH) needs to be transmitted, in a slot on which the physical uplink shared channel (PUSCH) needs to be transmitted, on the basis of the K2 value, by using a length (L) and the index(S) of a starting symbol in the slot. The symbol on which the physical uplink shared channel (PUSCH) needs to be transmitted corresponds to symbol S to symbol S+L−1 in the slot obtained on the basis of the K2 value. For reference, symbol S to symbol S+L−1 are L consecutive symbols.

An uplink slot aggregation may be additionally configured for the terminal by a base station. An uplink slot aggregation value may be 2, 4, and 8. When an uplink slot aggregation is configured, the terminal is required to transmit a physical uplink shared channel (PUSCH) on consecutive slots corresponding to the slot aggregation value from the slot obtained on the basis of the K2 value.

In FIG. 12 to FIG. 14, a terminal uses a K0 value, a K1 value, and a K2 value to determine a slot on which a scheduled physical downlink shared channel (PDSCH) is received, and slots on which a physical uplink control channel (PUCCH) and a physical uplink shared channel (PUSCH) are transmitted. For convenience in the present invention, a slot obtained by assuming the K0 value, the K1 value, and the K2 value to be 0 is called a reference point or a reference slot.

A reference slot applying a K0 value in FIG. 12 is downlink slot n that is a slot on which a PDCCH is received.

A reference slot applying a K1 value in FIG. 13 is uplink slot n+3 that is an uplink slot overlapping with the last symbol of a PDSCH.

A reference slot applying a K1 value in FIG. 14 is uplink slot n that is an uplink slot overlapping with the last symbol of a PDCCH. In addition, a reference slot applying a K2 value is uplink slot n.

For convenience in the present invention, the following description provides an assumption that the subcarrier spacing of a downlink BWP in which a terminal receives a PDSCH and a PDCCH and the subcarrier spacing of an uplink BWP in which the terminal transmits a PUSCH and a PUCCH are the same. In this case, uplink slots and downlink slots are expressed by slots without being separately distinguished.

In the above description, a terminal receives one piece of DCI from a base station, and receives a PDSCH or transmits a PUSCH on one slot on the basis of the piece of DCI. However, in a case where a base station provides scheduling information for one slot to a terminal through one piece of DCI as described above, the base station is required to transmit pieces of DCI, the number of which is the same as that of multiple slots, so as to perform scheduling on the slots. This may cause a waste of downlink resources.

In order to solve the waste, a method of receiving, by a terminal, one piece of DCI from a base station and receiving a PDSCH on multiple slots on the basis of the piece of DCI may be used. PDSCHs received on respective slots may include different pieces of downlink data. More specifically, PDSCHs received on respective slots may include different transport blocks (TBs). In addition, PDSCHs received on respective slots may have different HARQ process numbers. In addition, PDSCHs received on respective slots may occupy different symbols in the respective slots.

In addition, a method of receiving, by a terminal, one piece of DCI from a base station and transmitting a PUSCH on multiple slots on the basis of the piece of DCI may be used. PUSCHs transmitted on respective slots may include different pieces of uplink data. More specifically, PUSCHs transmitted on respective slots may include different transport blocks (TBs). In addition, PUSCHs transmitted on respective slots may have different HARQ process numbers. In addition, PUSCHs transmitted on respective slots may occupy different symbols in the respective slots.

As described above, receiving a PDSCH or transmitting a PUSCH on multiple slots on the basis of one piece of DCI is called multi-slot scheduling for convenience.

For reference, multi-slot scheduling differs from conventional slot aggregation (a scheme of repeatedly receiving a PDSCH on multiple slots or repeatedly transmitting a PUSCH on multiple slots) in the following points.

Conventional slot aggregation (a scheme of repeatedly receiving a PDSCH on multiple slots or repeatedly transmitting a PUSCH on multiple slots) is a scheme of repeatedly receiving or transmitting a PDSCH or a PUSCH having the same TB on multiple slots so as to enlarge coverage and improve reliability. However, multi-slot scheduling is a scheme of receiving or transmitting PDSCHs or PUSCHs having different TBs on multiple slots so as to reduce the overhead of a downlink control channel.

In conventional downlink slot aggregation (a scheme of repeatedly receiving a PDSCH on multiple slots), a PDSCH including the same TB is received on multiple slots, and thus whether the same TB has been successfully received is determined through the PDSCHs received on the multiple slots. Therefore, a terminal is required to transmit, to a base station, an HARQ-ACK indicating whether the one TB has been successfully received. However, in multi-slot scheduling, PDSCHs received on multiple slots include different TBs, and thus a terminal needs to determine, for each TB, whether reception has been successful. In addition, the terminal is required to transmit, to the base station and for each TB, an HARQ-ACK indicating whether reception has been successful.

Hereinafter, scheduling for multiple slots will be described with reference to FIG. 15 to FIG. 17.

Figure 15:
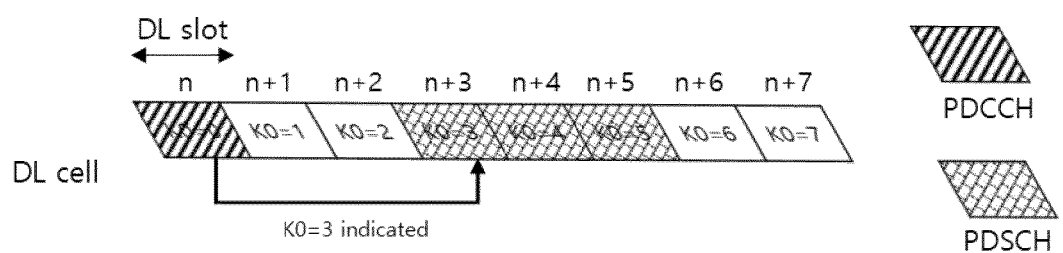
FIG. 15 is a diagram illustrating scheduling of a downlink shared channel according to multi-slot scheduling according to an embodiment of the present invention.

FIG. 15 is a diagram illustrating scheduling of a downlink shared channel according to multi-slot scheduling according to an embodiment of the present invention.

Referring to FIG. 15, PDSCH reception on multiple slots may be scheduled for a terminal through one piece of DCI of a PDCCH. That is, multiple PDSCHs may be scheduled for the terminal through one piece of DCI.

Specifically, one piece of DCI may schedule PDSCH reception on multiple slots. As illustrated in FIG. 15, a PDCCH including one piece of DCI may be received on slot n. A time domain resource assignment (TDRA) field included in one piece of DCI may indicate a K0 value that is timing information of scheduled slots, and starting length indicator values (SLIVs), each of which is the index of a starting symbol in the slot and a length. More specifically, the first slot on which a PDSCH is transmitted may be determined through the K0 value. PDSCH reception may be scheduled on M consecutive slots from the first slot determined through the K0 value. For example, as illustrated in FIG. 15, if K0 is "3" and M is "3", PDSCH reception may be scheduled on slot n+3, slot n+4, and slot n+5. The index(S) of a starting symbol and the number (L) of consecutive symbols for PDSCH reception on a slot may be indicated to the terminal. The index and number may be different or identical for each slot. If the index and number are different for each slot, the index(S) of a starting symbol and the number (L) of consecutive symbols for PDSCH reception on each slot may be independently indicated.

[Table 4] below shows a TDRA table used in multi-slot scheduling, as an example. The TDRA table may be configured by 12 entries, and respective entries may be assigned indexes 0 to 11. Each entry may schedule a PDSCH on a maximum of 4 slots. In order to represent the scheduling, each entry may be given a maximum of 4 starting and length values (SLIVs) and 4 K0 values. The K0 value indicates the difference between a slot on which a PDCCH is received and a slot on which a PDSCH is received. The SLIV denotes the starting index(S) of symbols on which a PDSCH is received in a slot and the number (L) of consecutive symbols. In [Table 4], a PDSCH scheduled on one slot may be expressed by (K0,S,L).

TABLE 4

| Index | (K0, S, L) | (K0, S, L) | (K0, S, L) | (K0, S, L) |
|---|---|---|---|---|
| 0 | (0, 0, 14) | (1, 0, 14) | | |
| 1 | (0, 0, 7) | (1, 0, 7) | | |
| 2 | (0, 7, 7) | (1, 7, 7) | | |
| 3 | (0, 0, 14) | (1, 0, 14) | (2, 0, 14) | (3, 0, 14) |
| 4 | (0, 0, 7) | (1, 0, 7) | (2, 0, 7) | (3, 0, 7) |
| 5 | (0, 7, 7) | (1, 7, 7) | (2, 7, 7) | (3, 7, 7) |
| 6 | (0, 0, 14) | (1, 0, 7) | | |
| 7 | (0, 0, 14) | (1, 7, 7) | | |
| 8 | (0, 0, 7) | (1, 0, 14) | | |
| 9 | (0, 0, 7) | (1, 7, 7) | | |
| 10 | (0, 7, 7) | (1, 0, 14) | | |
| 11 | (0, 7, 7) | (1, 0, 7) | | |

If PDSCHs are schedulable on consecutive slots by multi-slot scheduling, a K0 value indicating a scheduled slot may be omitted. This is shown in [Table 5] below. More specifically, each entry of the TDRA table may include only one K0 value. In addition, each entry may include two or more SLIV values (i.e. (S,L)). In this case, reception of a PDSCH may be scheduled on symbols corresponding to a first SLIV value (a first (S,L)) on a slot determined according to a K0 value, and reception of a PDSCH may be scheduled on symbols corresponding to a second SLIV value (a second (S,L)) on the next slot.

TABLE 5

| Index | K0 | (S, L) | (S, L) | (S, L) | (S, L) |
|---|---|---|---|---|---|
| 0 | 0 | (0, 14) | (0, 14) | | |
| 1 | 0 | (0, 7) | (0, 7) | | |
| 2 | 0 | (7, 7) | (7, 7) | | |
| 3 | 0 | (0, 14) | (0, 14) | (0, 14) | (0, 14) |
| 4 | 0 | (0, 7) | (0, 7) | (0, 7) | (0, 7) |
| 5 | 0 | (7, 7) | (7, 7) | (7, 7) | (7, 7) |
| 6 | 0 | (0, 14) | (0, 7) | | |
| 7 | 0 | (0, 14) | (7, 7) | | |
| 8 | 0 | (0, 7) | (0, 14) | | |
| 9 | 0 | (0, 7) | (7, 7) | | |
| 10 | 0 | (7, 7) | (0, 14) | | |
| 11 | 0 | (7, 7) | (0, 7) | | |

If PDSCHs are schedulable on non-consecutive slots by multi-slot scheduling, a K0 value indicating a scheduled slot and an offset value for the slot of the K0 value may be included. The offset value indicates the difference between the slot indicated by the K0 value and a slot indicated for reception. This is shown in [Table 6]. More specifically, each entry of the TDRA table may include only one K0 value. Each SLIV may additionally have an offset value (O in [Table 6]). For reference, in the SLIV of the slot of the K0 value, the offset value may be omitted.

TABLE 6

| Index | K0 | (O, S, L) | (O, S, L) | (O, S, L) | (O, S, L) |
|---|---|---|---|---|---|
| 0 | 0 | (0, 0, 14) | (1, 0, 14) | | |
| 1 | 0 | (0, 0, 7) | (1, 0, 7) | | |
| 2 | 0 | (0, 7, 7) | (1, 7, 7) | | |
| 3 | 0 | (0, 0, 14) | (1, 0, 14) | (2, 0, 14) | (3, 0, 14) |

TABLE 6-continued

| Index | K0 | (O, S, L) | (O, S, L) | (O, S, L) | (O, S, L) |
|---|---|---|---|---|---|
| 4 | 0 | (0, 0, 7) | (1, 0, 7) | (2, 0, 7) | (3, 0, 7) |
| 5 | 0 | (0, 7, 7) | (1, 7, 7) | (2, 7, 7) | (3, 7, 7) |
| 6 | 0 | (0, 0, 14) | (1, 0, 7) | | |
| 7 | 0 | (0, 0, 14) | (1, 7, 7) | | |
| 8 | 0 | (0, 0, 7) | (1, 0, 14) | | |
| 9 | 0 | (0, 0, 7) | (1, 7, 7) | | |
| 10 | 0 | (0, 7, 7) | (1, 0, 14) | | |
| 11 | 0 | (0, 7, 7) | (1, 0, 7) | | |

In the present invention, for convenience of explanation, a case where PDSCHs are scheduled on multiple consecutive slots is described. Therefore, unless otherwise noted, the value of K0 is omitted. However, the present invention also includes a case where PDSCHs are scheduled on multiple non-consecutive slots.

Figure 16:
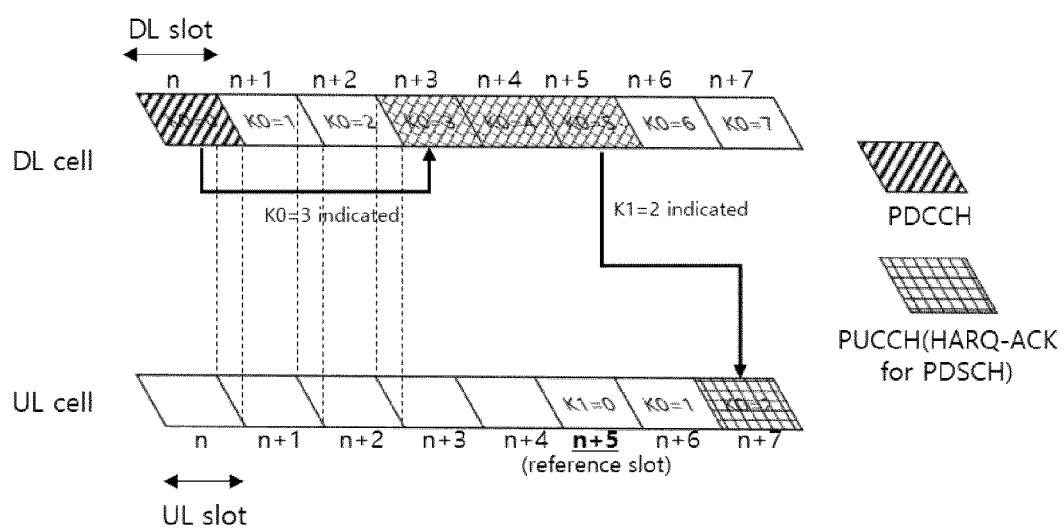
FIG. 16 is a diagram illustrating uplink control channel transmission in one slot according to multi-slot scheduling according to an embodiment of the present invention.

FIG. 16 is a diagram illustrating uplink control channel transmission in one slot according to multi-slot scheduling according to an embodiment of the present invention.

Referring to FIG. 16, PDSCH reception on multiple slots may be scheduled for a terminal through one piece of DCI of a PDCCH, and a HARQ-ACK of the scheduled multiple PDSCHs may be transmitted on one slot through a PUCCH.

Specifically, a HARQ-ACK of PDSCHs scheduled through one piece of DCI to be received on multiple slots may be transmitted on one slot through a PUCCH. An uplink slot overlapping with an ending time point of the last PDSCH among the PDSCHs received on the multiple slots may be determined as an uplink slot having a K1 value of 0. In FIG. 16, uplink slot n+5 is an uplink slot having a K1 value of 0 and may be called a reference slot. One K1 value may be indicated to the terminal from the one piece of DCI. In this case, the terminal may transmit, on an uplink slot corresponding to the one K1 value, the HARQ-ACK of the PDSCHs scheduled by the one piece of DCI to be received on multiple slots.

That is, reception of multiple PDSCHs on multiple slots and transmission of a HARQ-ACK on one slot may be scheduled for the terminal through one piece of DCI. The terminal may determine the first slot for transmission of multiple PDSCHs through a K0 value of DCI, and determine one slot for transmitting a HARQ-ACK for the multiple PDSCHs through a K1 value by using, as a reference slot, a slot on which the last PDSCH among the multiple PDSCHs has been transmitted.

Figure 17:
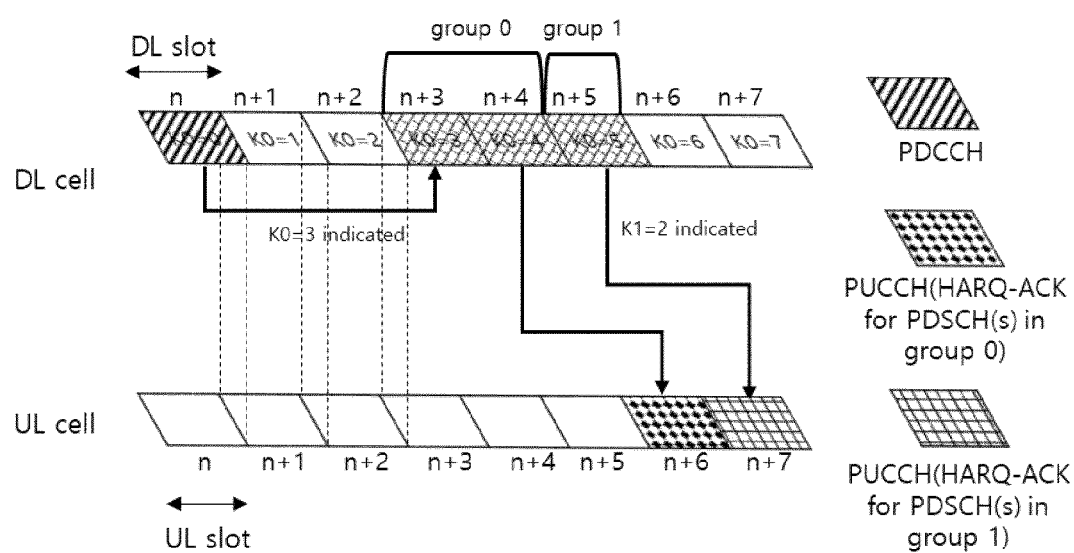
FIG. 17 is a diagram illustrating uplink control channel transmission in two or more slots according to multi-slot scheduling according to an embodiment of the present invention.

FIG. 17 is a diagram illustrating uplink control channel transmission in two or more slots according to multi-slot scheduling according to an embodiment of the present invention.

Referring to FIG. 17, PDSCH reception on multiple slots may be scheduled for a terminal through one piece of DCI of a PDCCH, and HARQ-ACKs of the scheduled multiple PDSCHs may be transmitted on two or more slots through PUCCHs.

Specifically, HARQ-ACKs of multiple PDSCHs scheduled through one piece of DCI to be received on multiple slots may be transmitted on two or more slots through PUCCHs. In this case, first, PDSCHs scheduled through one piece of DCI to be received on multiple slots may be grouped into two or more groups. For example, multiple PDSCHs may be grouped into two or more groups according to a time order, and PDSCHs that are consecutive in a time order (i.e., sequentially over time) may be grouped into one group. As illustrated in FIG. 17, one pieces of DCI may schedule reception of PDSCHs on 3 slots, group the first 2

PDSCHs among the PDSCHs of the 3 slots to make one group (group 0), and group the last 1 PDSCH to make one group (group 1). A detailed method of the grouping is as follows.

As the first method, the terminal may group PDSCHs on the basis of the number of PDSCHs scheduled by one piece of DCI. The number of grouped PDSCHs may be limited to a predetermined number. Therefore, PDSCHs may be grouped by a predetermined number and one or more groups may be generated. For example, if a predetermined number is 2 and the number of PDSCHs are 4, the 4 PDSCHs may be grouped into groups each containing 2 PDSCHs. The predetermined number may be configured by a base station.

As the second method, the terminal may make groups on the basis of the number of groups predetermined by one piece of DCI. That is, a predetermined number of groups may be configured for the terminal by the base station. For example, if the predetermined number of groups is 2 and the number of PDSCHs scheduled by one piece of DCI is 6, the 6 PDSCHs may be divided into 2 groups. PDSCHs may be grouped into one group sequentially over time, PDSCHs are included in each group as equal in number as possible, and a maximum number difference therebetween may be up to 1.

As the third method, grouping for each entry in a TDRA may be configured for the terminal. More specifically, each entry in a TDRA includes information for PDSCH reception on multiple slots. Here, information relating to slots, the PDSCHs of which are grouped into one group, may be included. That is, a SLIV indicating PDSCH reception of each slot and the index of a group in which the SLIV is included may be included together. Referring to [Table 7], the index (G) of a group in which a SLIV is included may be included in each entry of a TDRA table. SLIVs belonging to G=0 corresponds to group 0, and SLIVs belonging to G=1 corresponds to group 1.

TABLE 7

| Index | (K0, S, L, G) | (K0, S, L, G) | (K0, S, L, G) | (K0, S, L, G) |
|---|---|---|---|---|
| 0 | (0, 0, 14, 0) | (1, 0, 14, 0) | | |
| 1 | (0, 0, 7, 0) | (1, 0, 7, 0) | | |
| 2 | (0, 7, 7, 0) | (1, 7, 7, 0) | | |
| 3 | (0, 0, 14, 0) | (1, 0, 14, 0) | (2, 0, 14, 1) | (3, 0, 14, 1) |
| 4 | (0, 0, 7, 0) | (1, 0, 7, 0) | (2, 0, 7, 1) | (3, 0, 7, 1) |
| 5 | (0, 7, 7, 0) | (1, 7, 7, 0) | (2, 7, 7, 1) | (3, 7, 7, 1) |
| 6 | (0, 0, 14, 0) | (1, 0, 7, 0) | | |
| 7 | (0, 0, 14, 0) | (1, 7, 7, 0) | | |
| 8 | (0, 0, 7, 0) | (1, 0, 14, 0) | | |
| 9 | (0, 0, 7, 0) | (1, 7, 7, 0) | | |
| 10 | (0, 7, 7, 0) | (1, 0, 14, 0) | | |
| 11 | (0, 7, 7, 0) | (1, 0, 7, 0) | | |

The terminal may transmit a HARQ-ACK of PDSCHs included in one group through a PUCCH of an uplink slot. As a method of determining the uplink slot, an uplink slot, which overlaps with an ending time point of the last PDSCH included in a group and has a K1 value of 0, may be determined as a reference slot. That is, in FIG. 17, the reference slot of group 0 is slot n+4, and the reference slot of group 1 is slot n+5.

One K1 value may be indicated to the terminal from the one piece of DCI. In this case, for each group, the terminal may transmit, on an uplink slot corresponding to the one K1 value, the HARQ-ACK of the PDSCHs scheduled by the one piece of DCI to be received on multiple slots. For example, in FIG. 17, K1 is equal to 2 (K1=2). A HARQ-ACK of two PDSCHs included in group 0 is transmitted on a PUCCH of slot n+4+2 (=the reference slot index of group 0+K1), and a HARQ-ACK of one PDSCH included in group 1 is transmitted on a PUCCH of slot n+7 (=the reference slot index of group 1+K1).

One K1 value of each group may be indicated to the terminal from the one piece of DCI. In this case, for each group, the terminal may transmit, on an uplink slot corresponding to K1 of a corresponding group, the HARQ-ACK of the PDSCHs scheduled by the one piece of DCI to be received on multiple slots. For example, 1 for group 0 and 2 for group 1 may be given as K1 values. In this case, a HARQ-ACK of two PDSCHs included in group 0 is transmitted on a PUCCH of slot n+4+K1 (=the reference slot index of group 0+K1 of group 0), and a HARQ-ACK of one PDSCH included in group 1 is transmitted on a PUCCH of slot n+7 (=the reference slot index of group 1+K1 of group 1).

In the present invention, a method of, when PDSCHs are scheduled through multi-slot scheduling, transmitting a HARQ-ACK of the PDSCHs is described.

Figure 18:
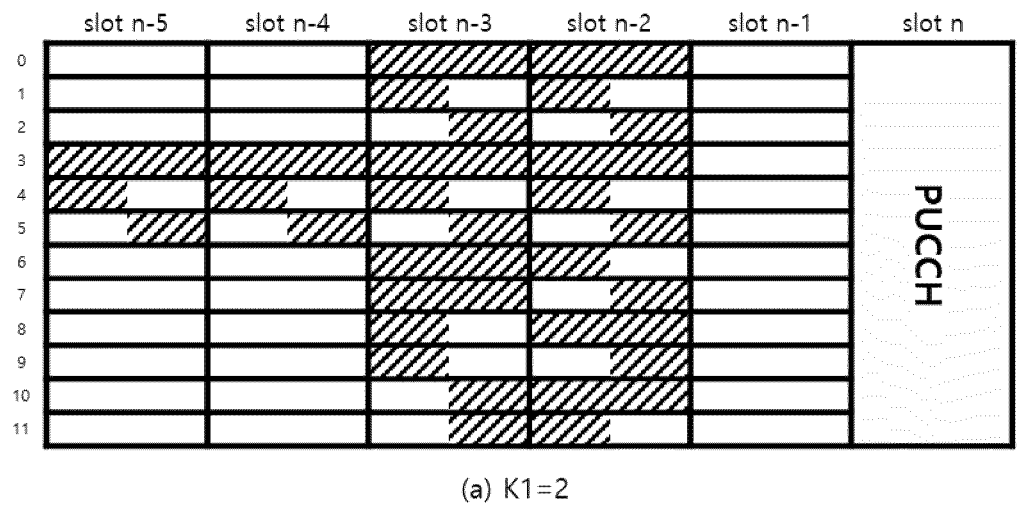
FIG. 18 is a diagram illustrating downlink shared channel candidates corresponding to a HARQ-ACK when an uplink control channel is transmitted on an n-th slot according to an embodiment of the present invention.
Figure 18:
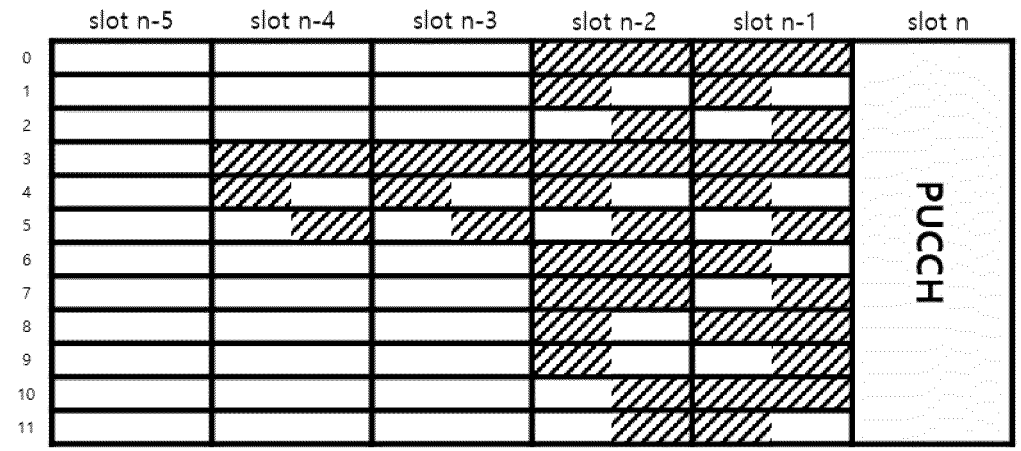

FIG. 18 is a diagram illustrating downlink shared channel candidates corresponding to a HARQ-ACK when an uplink control channel is transmitted on an n-th slot according to an embodiment of the present invention.

A terminal in an NR wireless communication system may transmit a codebook including hybrid automatic repeat request (HARQ-ACK) information to transmit signaling relating to whether reception of a downlink signal or channel is successful. A HARQ-ACK codebook includes one or more bits indicating whether reception of a downlink channel or signal is successful. Here, a downlink channel may include at least one of a physical downlink shared channel (PDSCH), a semi-persistent scheduling (SPS) PDSCH, and a PDSCH releasing an SPS PDSCH. A HARQ-ACK codebook may be classified as a semi-static HARQ-ACK codebook and a dynamic HARQ-ACK codebook. A base station may configure one of two HARQ-ACK codebooks for the terminal. The terminal may use the HARQ-ACK codebook configured for the terminal.

Type-1 HARQ-ACK Codebook

It is assumed that 1 and 2 are configured for the terminal as K1 values. In a case where a TDRA table as shown in [Table 4] is configured, when a PUCCH is transmitted on slot n, PDSCH candidates corresponding to a HARQ-ACK required to be transmitted through the PUCCH are illustrated in FIG. 18.

In a case where a Type-1 HARQ-ACK codebook (semi-static HARQ-ACK codebook) is used, the base station may use an RRC signal to configure the number of bits of the HARQ-ACK codebook and information relating to a channel or signal, the successful or unsuccessful reception of which is determined by each bit of the HARQ-ACK codebook. Therefore, the base station is not required to transmit, to terminal, signaling relating to information required for HARQ-ACK codebook transmission every time the HARQ-ACK codebook transmission is required.

More specifically, a method of generating a Type-1 HARQ-ACK codebook is as follows. A Type-1 HARQ-ACK codebook is transmitted on slot n.

1) A set of indicatable K1 values is named K1 set. The largest K1 value is retrieved from K1 set. This value is denoted as K1 max. The K1 value is excluded from K set.

2) A set of PDSCH candidates that can be received on slot n−K1_max is called R. The PDSCH candidates included in set R have a starting symbol and a length received on a slot according to a TDRA table. When a symbol of a PDSCH candidate included in set R overlaps with a symbol configured as uplink in a semi-static UL/DL configuration, the PDSCH candidate is excluded from set R.
- 3) The terminal performs the following step A and step B for the PDSCH candidates included in R.
  - A) A new HARQ-ACK occasion is assigned to a PDSCH candidate having the foremost last symbol among the PDSCH candidates of set R. Then, if set R includes PDSCH candidate(s), at least one symbol of which overlaps with the PDSCH candidate having the foremost last symbol, the same HARQ-ACK occasion is assigned to the PDSCH candidate(s). The PDSCH candidates to which the HARQ-ACK occasion is assigned (a PDSCH candidate having the foremost last symbol and PDSCH candidate(s), at least one symbol of which overlaps with the PDSCH candidate) are excluded from set R.
  - B) Until set R becomes a null set, step 3-A is repeated.
- 4) Until K1_set becomes a null set, processes 1), 2) and 3) are repeated.

The terminal may generate a type-1 HARQ-ACK codebook on the basis of the HARQ-ACK occasion. If the terminal has received DCI scheduling a PDSCH or a semi-persistent scheduling (SPS) PDSCH, the terminal may transmit HARQ-ACK information of the PDSCH in a HARQ-ACK occasion of the PDSCH. If the terminal has failed to receive any one of PDSCHs corresponding to one HARQ-ACK occasion, the HARQ-ACK occasion may be configured to be a NACK.

For reference, a HARQ-ACK occasion may include an ACK/NACK of 1 bit or an ACK/NACK of multiple bits. For example, if a PDSCH of the terminal includes one TB, an ACK/NACK of 1 bit may be included in the HARQ-ACK occasion, and if the PDSCH includes two TBs, a 2-bit ACK/NACK may be included in the HARQ-ACK occasion. Furthermore, if reception of a code block group (CBG)-based PDSCH is configured for the terminal, an ACK/NACK corresponding to a maximum number of CBGs that one PDSCH can include may be included in the HARQ-ACK occasion.

Hereinafter, in the present invention, 1 bit is assumed per HARQ-ACK occasion for convenience of explanation.

A problem to be solved in the present invention relates to a method of, when PDSCHs are scheduled through multi-slot scheduling, generating a Type-1 HARQ-ACK codebook (semi-static HARQ-ACK codebook).

First Embodiment: Based on PDSCH Candidates in Slot

The first embodiment of the present invention is a method of converting PDSCHs scheduled through multi-slot scheduling into PDSCH candidates of each slot, and generating a type-1 HARQ-ACK codebook by using the PDSCH candidates in each slot. More specifically, a type-1 HARQ-ACK codebook generation method according to the first embodiment is as follows.
- 1) Step 1: A set of indicatable K1 values is named K1_set. The terminal may determine the indexes of slots on which PDSCH candidates required to be included in a Type-1 HARQ-ACK codebook are received, on the basis of K1 set and a TDRA table. A set of the indexes is called K_slot.

More specifically, a method of determining the index set K-slot is as follows. One K1 value may be selected from K1_set. The selected K1 value is K1_a. The terminal may determine a slot on which a PDSCH is required to be received, on the basis of the K1 a value and the TDRA table. For example, if the TDRA table includes PDSCH allocation information for a maximum of N consecutive slots, the PDSCH allocation information may be determined as PDSCH allocation information of slot n-K1_a–(N–1), slot n-K1_a–(N–2), . . . , and slot n-K1_a. Therefore, the K_slot set may include K1_a+(N–1), K1 a+(N–2), . . . , and K1_a. (For reference, the TDRA table may include PDSCH allocation information for non-consecutive slots.) In this case, N is the number of slots from the earliest scheduled slot to the latest scheduled slot among slots scheduled in the TDRA table, and a slot not scheduled in the TDRA table among slot n-K1_a–(N–1) to slot n-K1_a may be excluded.

As described above, the indexes of slots on which PDSCH candidates can be received may be obtained for all K1 values of K1_set, and the indexes are collected and included in a K_slot set.
- 2) Step 2: The largest K1 value is retrieved from K_slot. This value is denoted as K1 max. The K1 value is excluded from K_slot.
- 3) Step 3: A set of PDSCH candidates that can be received on slot n-K1_max is called R. When a symbol of a PDSCH candidate included in set R overlaps with a symbol configured as uplink in a semi-static UL/DL configuration, the PDSCH candidate is excluded from set R.

The PDSCH candidates included in set R may be obtained as follows. One K1 value may be selected from K1_set. The selected K1 value is K1 a. The terminal may determine a PDSCH candidate on slot n-K1_max on the basis of the K1_a value and the TDRA table. For example, if one entry of the TDRA table includes PDSCH allocation information for a maximum of M consecutive slots, the PDSCH allocation information may be determined as PDSCH allocation information of slot n-K1 a–(M–1), slot n-K1_a–(M–2), . . . , and slot n-K1_a. If one slot among slot n-K1_a–(M–1), slot n-K1_a–(M–2), . . . , and slot n-K1_a is slot n-K1_max, a PDSCH candidate included in the slot may be included in set R. The above process is performed for all entries of the TDRA table, and the above process may be performed for all K1 values of K1 set.
- 4) Step 4: The terminal performs the following step A and step B for the PDSCH candidates included in R.
  - A) A new HARQ-ACK occasion is assigned to a PDSCH candidate having the foremost last symbol among the PDSCH candidates of set R. Then, if set R includes PDSCH candidate(s), at least one symbol of which overlaps with the PDSCH candidate having the foremost last symbol, the same HARQ-ACK occasion is assigned to the PDSCH candidate(s). The PDSCH candidates to which the HARQ-ACK occasion is assigned (a PDSCH candidate having the foremost last symbol and PDSCH candidate(s), at least one symbol of which overlaps with the PDSCH candidate) are excluded from set R.
  - B) Until set R becomes a null set, step 4-A is repeated.
- 5) Step 5: Until K1_slot becomes a null set, steps 2/3/4 are repeated.

Figure 19:
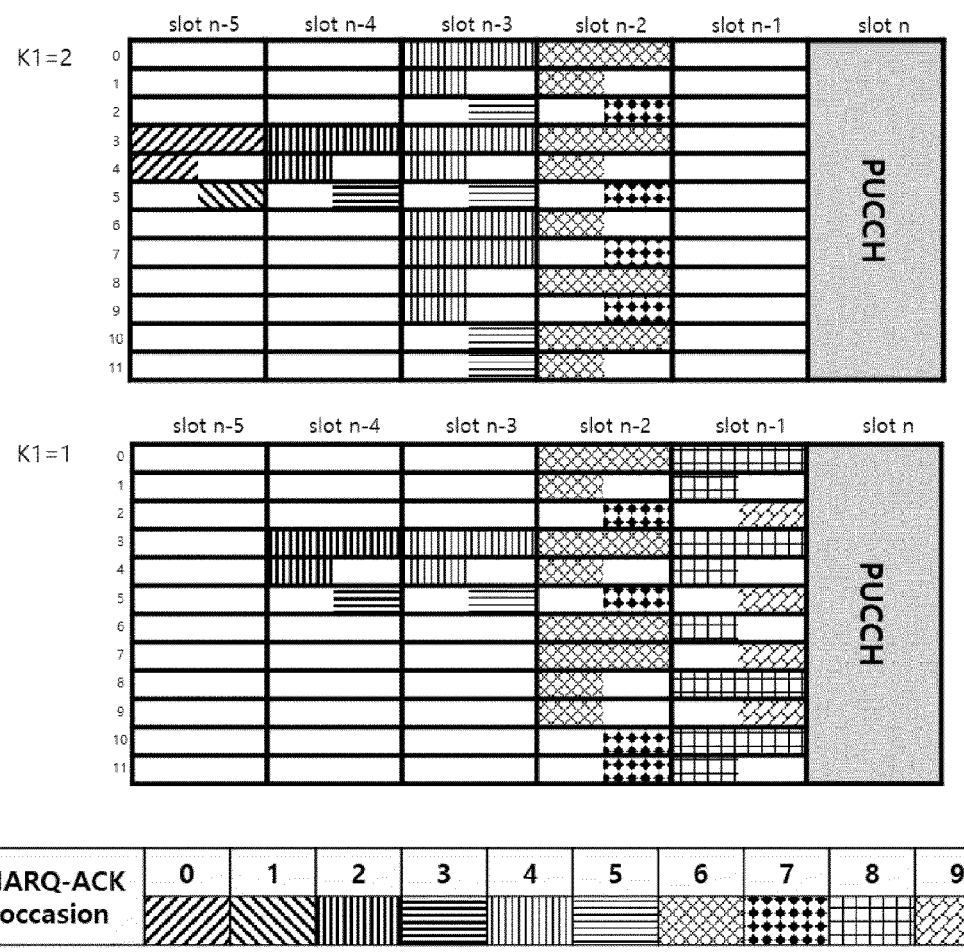
FIG. 19 is a diagram illustrating a HARQ-ACK occasion according to an embodiment of the present invention.

FIG. 19 is a diagram illustrating a HARQ-ACK occasion according to an embodiment of the present invention.

Referring to FIG. 19, PDSCHs scheduled through multi-slot scheduling are converted into PDSCH candidates of each slot, and a type-1 HARQ-ACK codebook may be generated by using the PDSCH candidates in each slot.

Specifically, a type-1 HARQ-ACK codebook may be generated through the following 5 steps as illustrated in FIG. 19.

1) Step 1: 1 and 2 are configured for the terminal as K1 values and thus K1_set is equal to 1 and 2 (K1_set=1,2). The terminal may determine K1_slot through the following process.

One value may be selected in K1_set. For example, if K1_a that is a value selected in K1 set is "2", each entry of a TDRA table includes PDSCH allocation information for a maximum of N consecutive slots (N=4), the terminal may determine the PDSCH allocation information to be PDSCH allocation information of slot n-K1_a-(N-1)=n-2-(4-1)=n-5, slot n-K1_a-(N-2)=n-2-(4-2)=n-4, slot n-K1_a-(N-3)=n-2-(4-3)=n-3, and slot n-K1_a=n-2. Therefore, K1_slot includes 5, 4, 3, and 2.

Thereafter, if the remaining one value is selected in K1_set and the selected value K1 a is "1", each entry of the TDRA table includes PDSCH allocation information for a maximum of N consecutive slots (N=4), the terminal may determine the PDSCH allocation information to be PDSCH allocation information of slot n-K1_a-(N-1)=n-1-(4-1)=n-4, slot n-K1_a-(N-2)=n-1-(4-2)=n-3, slot n-K1_a-(N-3)=n-1-(4-3)=n-2, and slot n-K1_a=n-1. Therefore, K1_slot includes 4, 3, 2, and 1.

Therefore, K1_slot includes 5, 4, 3, 2, and 1.

2) Step 2: K1_max=5, the largest value is selected in K1_slot. The K1 value is excluded from K1_slot.

3) Step 3: A set of PDSCH candidates that can be received on slot n-K1 max=n-5 is called R. When a symbol of a PDSCH candidate included in set R overlaps with a symbol configured as uplink in a semi-static UL/DL configuration, the PDSCH candidate is excluded from set R. Here, all symbols are assumed to be downlink symbols.

The PDSCH candidates included in set R on slot n-5 may be obtained as follows.

One value is selected in K1 set. This value is denoted as K1 a=2. Entries 3, 4, and 5 of the TDRA table include PDSCH allocation information of 4 consecutive slots including slot n-K1_a-(M-1)=n-5, slot n-K1_a-(M-2)=n-4, . . . , and slot n-K1 a=n-2 and the remaining entries (0, 1, 2, 6, 7, 8, 9, 10, and 11) include PDSCH allocation information of 2 consecutive slots including slot n-3 and slot n-2. Therefore, entries 3, 4, and 5 of the TDRA table include PDSCH candidates of slot n-K1_max=n-5, and thus the PDSCH candidates included in the slot may be included in set R. That is, set R of PDSCH candidates that can be received on slot n-K1_max=n-5 may include the followings. Set R may include (S=0,L=14), (S=0,L=7), and (S=7, L=7). For reference, (S=0,L=14) is a PDSCH candidate on slot n-5 in entry 3 of the TDRA table, (S=0,L=7) is a PDSCH candidate on slot n-5 in entry 4 of the TDRA table, and (S=7,L=7) is a PDSCH candidate on slot n-5 in entry 5 of the TDRA table.

The remaining one value is selected in K1_set. This value is denoted as K1_a=1. Entries 3, 4, and 5 of the TDRA table include PDSCH allocation information of 4 consecutive slots including slot n-K1_a-(M-1)=n-4, slot n-K1_a-(M-2)=n-3, . . . , and slot n-K1_a=n-1 and the remaining entries (0, 1, 2, 6, 7, 8, 9, 10, and 11) include PDSCH allocation information of 2 consecutive slots including slot n-2 and slot n-1. Therefore, the slots corresponding to K1_a=1 do not overlap with slot n-K1_max=n-5, and thus there is no PDSCH candidate to be included in set R.

Therefore, R is equal to (S=0,L=14), (S=0,L=7), and (S=7,L=7).

4) Step 4: The terminal performs the following step A and step B for the PDSCH candidates included in R.

A) HARQ-ACK occasion 0 is assigned to (S=0,L=7) which is a PDSCH candidate having the foremost last symbol among the PDSCH candidates of set R. Then, the same HARQ-ACK occasion is assigned to the PDSCH candidate (S=0,L=14), at least one symbol of which overlaps with the PDSCH candidate (S=0,L=7) having the foremost last symbol in set R. (S=0,L=7) and (S=0,L=14) which are PDSCH candidates to which the HARQ-ACK occasion is assigned are excluded from set R. Therefore, set R is equal to (S=7,L=7).

B) Until set R becomes a null set, step 4-A is repeated.

Set R is not a null set, and thus step 4-A is repeated again. According to step 4-A, HARQ-ACK occasion 1 is assigned to the PDSCH candidate (S=7,L=7) and set R becomes a null set. Therefore, step 4 is terminated.

5) Step 5: Until K1_slot becomes a null set, steps 2/3/4 are repeated.

K1_slot=4, 3, 2, 1 and thus is not a null set. K1_slot is not a null set, and thus steps 2/3/4 are repeated again.

According to the steps, PDSCH candidates and HARQ-ACK occasions are determined as follows.

HARQ-ACK occasion 0: PDSCH candidates (S=0, L=7) and (S=0, L=14) of slot n-5

HARQ-ACK occasion 1: PDSCH candidate (S=7, L=7) of slot n-5

HARQ-ACK occasion 2: PDSCH candidates (S=0, L=7) and (S=0, L=14) of slot n-4

HARQ-ACK occasion 3: PDSCH candidate (S=7, L=7) of slot n-4

HARQ-ACK occasion 4: PDSCH candidates (S=0, L=7) and (S=0, L=14) of slot n-3

HARQ-ACK occasion 5: PDSCH candidate (S=7, L=7) of slot n-3

HARQ-ACK occasion 6: PDSCH candidates (S=0, L=7) and (S=0, L=14) of slot n-2

HARQ-ACK occasion 7: PDSCH candidate (S=7, L=7) of slot n-2

HARQ-ACK occasion 8: PDSCH candidates (S=0, L=7) and (S=0, L=14) of slot n-1

HARQ-ACK occasion 9: PDSCH candidate (S=7, L=7) of slot n-1

Therefore, a Type-1 HARQ-ACK codebook may be configured by 10 HARQ-ACK occasions.

For example, DCI received by the terminal is assumed as having indicated entry 4 of the TDRA table and K1=2. In this case, the terminal receives a first PDSCH (S=0,L=7) on slot n-5, a second PDSCH (S=0,L=7) on slot n-4, a third PDSCH (S=0,L=7) on slot n-3, and a fourth PDSCH (S=0,L=7) on slot n-2. The terminal includes a HARQ-ACK ($o_1$) of the first PDSCH in HARQ-ACK occasion 0, includes a HARQ-ACK ($o_2$) of the second PDSCH in HARQ-ACK occasion 2, includes a HARQ-ACK ($o_3$) of the third PDSCH in HARQ-ACK occasion 4, and includes a HARQ-ACK ($o_4$) of the fourth PDSCH in HARQ-ACK occasion 6. Therefore, a Type-1 HARQ-ACK codebook is [o1 N o2 N o3 N o4 N N N]. Here, N denotes a NACK.

Additionally, DCI received by the terminal is assumed as having indicated entry 5 of the TDRA table and K1=1. In this case, the terminal receives a fifth PDSCH (S=7,L=7) on slot n-4, a sixth PDSCH (S=7,L=7) on slot n-3, a seventh PDSCH (S=7,L=7) on slot n-2, and an eighth PDSCH (S=7,L=7) on slot n-1. The terminal includes a HARQ-ACK ($o_5$) of the fifth PDSCH in HARQ-ACK occasion 3, includes a HARQ-ACK ($o_6$) of the sixth PDSCH in HARQ-ACK occasion 5, includes a HARQ-ACK ($o_7$) of the seventh PDSCH in HARQ-ACK occasion 7, and includes a HARQ-ACK ($o_8$) of the eighth PDSCH in HARQ-ACK occasion 9.

Therefore, the Type-1 HARQ-ACK codebook is [o1 N o2 o5 o3 o6 o4 o7 N o8]. Here, N denotes a NACK.

In the first embodiment of the present invention, HARQ-ACK occasions are made using PDSCH candidates in each slot. However, one piece of DCI is able to schedule PDSCHs on multiple slots, and thus making HARQ-ACK occasions by using PDSCH candidates of each slot may be inefficient. For example, referring to FIG. 19, a maximum of 8 PDSCHs may be scheduled for the terminal in any cases. This case corresponds to the followings.

(Entry 4 of TDRA table and K1=2, Entry 5 of TDRA table and K1=2)
(Entry 4 of TDRA table and K1=2, Entry 5 of TDRA table and K1=1)
(Entry 4 of TDRA table and K1=1, Entry 5 of TDRA table and K1=2)
(Entry 4 of TDRA table and K1=1, Entry 5 of TDRA table and K1=1)

Therefore, a type-1 HARQ-ACK codebook transmitted by the terminal needs to include 8 HARQ-ACK occasions. However, as discussed above, in this case, 10 HARQ-ACK occasions are included. 2 HARQ-ACK occasions are not always used to transmit HARQ-ACK information.

Second Embodiment: Based on PDSCH Candidates in all Slots

The second embodiment of the present invention is a method of generating a type-1 HARQ-ACK codebook by using PDSCH candidates in all slots. More specifically, a type-1 HARQ-ACK codebook generation method according to the second embodiment is as follows.

1) Step 1: The terminal may include, in set R, schedulable PDSCH candidate pairs. A PDSCH candidate pair is obtained by grouping PDSCH candidates schedulable according to an entry of a TDRA table. Therefore, a PDSCH candidate pair indicates PDSCH candidates, the reception of which is schedulable on multiple slots. In addition, when a symbol of a PDSCH candidate included in a PDSCH candidate pair included in set R overlaps with a symbol configured as uplink in a semi-static UL/DL configuration, the PDSCH candidate is excluded from the PDSCH candidate pair. If all PDSCH candidates are excluded from one PDSCH candidate pair, the PDSCH candidate pair is excluded from set R.

2) Step 2: The terminal performs the following step A and step B for the PDSCH candidate pairs included in set R.

A) One PDSCH candidate pair is retrieved from the PDSCH candidate pairs of set R. A new HARQ-ACK occasion is assigned to the PDSCH candidate pair. Then, if set R includes a PDSCH candidate pair(s), at least one symbol of which overlaps with the PDSCH candidate, the same HARQ-ACK occasion is assigned to the PDSCH candidate pairs. The PDSCH candidate pairs to which the HARQ-ACK occasion is assigned are excluded from set R.

B) Until set R becomes a null set, step 2-A is repeated.

Unlike the first embodiment, in the second embodiment, PDSCH candidate pairs correspond to a HARQ-ACK occasion. Each PDSCH candidate pair may include a different number of PDSCH candidates. Therefore, the number of PDSCH candidates which one HARQ-ACK occasion needs to indicate may be different. To this end, the number of PDSCH candidates which one HARQ-ACK occasion is required to indicate is determined on the basis of the largest number of PDSCH candidates with respect to PDSCH candidate pairs corresponding to the HARQ-ACK occasion.

In step 2-A, the terminal needs to select one PDSCH candidate pair in set R. To this end, at least the following methods or a combination of the same methods may be considered.

As the first method, the terminal may select a PDSCH candidate pair including the earliest started PDSCH candidate. Therefore, a HARQ-ACK occasion is preferentially assigned to PDSCH candidates which are located at the earliest time point in a time order.

As the second method, the terminal may select a PDSCH candidate pair, the ending time point of which is earliest. Therefore, a HARQ-ACK occasion is preferentially assigned to PDSCH candidates which end earliest in a time order.

As the third method, the terminal may select a PDSCH candidate pair having the fewest symbols. Therefore, the PDSCH candidate pair has the lowest possibility of overlapping with another PDSCH candidate pair.

As the fourth method, the terminal may select a PDSCH candidate pair having the most symbols. Therefore, the PDSCH candidate pair overlaps with the most PDSCH candidate pairs, and thus a large number of PDSCH candidates may be excluded from set R.

As the fifth method, the terminal may select a PDSCH candidate pair having the most slots. As mentioned above, a HARQ-ACK occasion is determined according to the number of PDSCH candidates included in a PDSCH candidate pair, and thus a PDSCH candidate pair with fewer slots overlapping with a PDSCH candidate pair with more slots may be searched for.

As the sixth method, the terminal may select a PDSCH candidate pair having the lowest index of the TDRA table. This may be configured by the base station when configuring the TDRA table.

Figure 20:
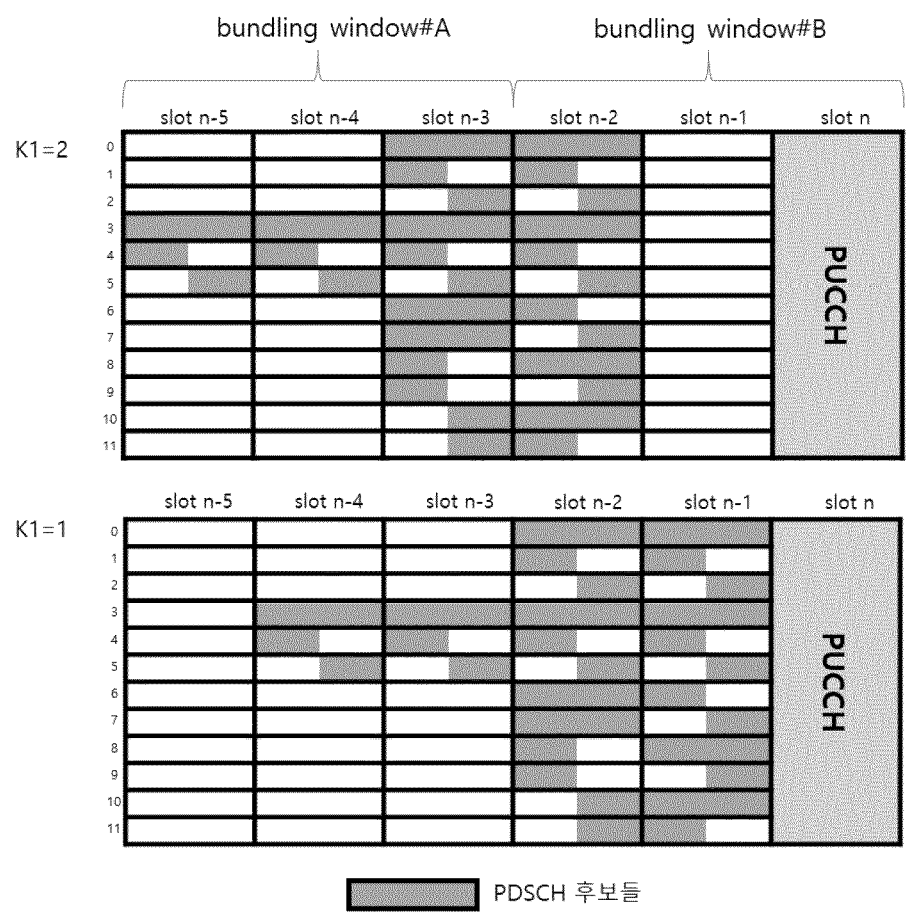
FIG. 20 is a diagram illustrating a time domain bundling window according to an embodiment of the present invention.

FIG. 20 is a diagram illustrating a time domain bundling window according to an embodiment of the present invention.

Time Domain Bundling

When a terminal generates a Type-1 HARQ-ACK codebook, time domain bundling may be configured therefor. Time domain bundling is a method of bundling HARQ-ACKs of respective PDSCHs into one HARQ-ACK bit (generating one HARQ-ACK bit by using the HARQ-ACKs through a binary "AND" operation, that is, if the HARQ-ACKs are all ACKs, the one HARQ-ACK bit is an ACK, and otherwise, the one HARQ-ACK bit is a NACK), and transmitting same. The PDSCHs may be PDSCHs on the same slot or PDSCHs on different slots. The PDSCHs are PDSCHs scheduled by one pieces of DCI and PDSCHs which are adjacent to each other when the PDSCHs are arranged in a time order. For example, when PDSCHs scheduled by one piece of DCI are PDSCH #0 on slot n, PDSCH #1 on slot n+1, PDSCH #2 on slot n+2, and PDSCH #3 on slot n+3, the terminal may bundle HARQ-ACKs of PDSCH #0 on slot n and PDSCH #1 on slot n+1 among the 4 PDSCHs into one HARQ-ACK bit, and bundle HARQ-ACKs of PDSCH #2 on slot n+2 and PDSCH #3 on slot n+3 into one HARQ-ACK bit. Therefore, 4 HARQ-ACK bits are generated for the 4 PDSCHs, but only 2 HARQ-ACK bits may be transmitted through time domain bundling.

At least one piece of information among the followings may be configured for the terminal by a base station for time domain bundling.

As first information, the base station may configure the number of HARQ-ACKs of PDSCHs (or the number of PDSCHs) to be bundled for time domain bundling. This is named $N_{bundle}$. The $N_{bundle}$ may be one value among 2, 4, and 8. If $N_{bundle}$ is configured for the terminal, the terminal bundles HARQ-ACKs of $N_{bundle}$ PDSCHs into one HARQ-ACK bit and transmits same. It is assumed that the terminal schedules M PDSCHs through one piece of DCI. If M is a multiple of $N_{bundle}$ (M mod $N_{bundle}$=0), the terminal may bundle $N_{bundle}$ PDSCHs to generate one bundled HARQ-ACK, and thus generate a total of M/$N_{bundle}$ bundled HARQ-ACKs. However, if M is not a multiple of $N_{bundle}$ (M mod $N_{bundle}$>0), the terminal may bundle PDSCHs as follows. For reference, PDSCH #0, PDSCH #1, . . . , and PDSCH #(M−1) are arranged in a time sequence.

As the first method, $N_{bundle}$ PDSCHs are bundled in a time order to generate one bundled HARQ-ACK. If the number of the remaining PDSCHs is smaller than $N_{bundle}$, the remaining PDSCHs are bundled to generate one bundled HARQ-ACK. More specifically, PDSCH #0, PDSCH #1, . . . , and PDSCH #($N_{bundle}$−1) are bundled to generate one bundled HARQ-ACK. PDSCH #($N_{bundle}$), PDSCH #($N_{bundle}$+1), . . . , and PDSCH #(2*$N_{bundle}$−1) are bundled to generate one bundled HARQ-ACK. Bundling continues as described above, and PDSCH #(floor (M/$N_{bundle}$) *$N_{bundle}$), PDSCH #(floor (M/$N_{bundle}$)*$N_{bundle}$+1), . . . , and PDSCH #(M−1) are bundled to generate one bundled HARQ-ACK. As a result, a total of ceil(M/$N_{bundle}$) bundled HARQ-ACK bits are generated.

As the second method, PDSCHs are bundled in a time order to make K=ceil(M/$N_{bundle}$) groups. The number of PDSCHs included in each of the groups may be ceil(M/K) or floor (M/K). Ceil (M/K) PDSCHs are bundled in a time order to make M mod K groups, and then floor (M/K) PDSCHs are bundled in the time order to make K−(M mod K) groups. The HARQ-ACKs in each of the groups are bundled to generate one bundled HARQ-ACK. As a result, a total of ceil(M/$N_{bundle}$) bundled HARQ-ACK bits are generated.

As second information, the base station may configure the number of bundled HARQ-ACKs (or the number of PDSCH groups) for time domain bundling. This is named $N_{group}$. The $N_{group}$ may be one value among 2, 4, and 8. If $N_{group}$ is configured for the terminal, the terminal may bundle M PDSCHs to make $N_{group}$ PDSCH groups. For reference, if M is smaller than $N_{group}$, the terminal bundles one PDSCH to make M PDSCH groups, and the next $N_{group}$−M groups do not include PDSCHs. A HARQ-ACK of a group not including PDSCHs may be configured as a NACK. A HARQ-ACK of a group not including PDSCHs may not be transmitted to the base station.

As the first method, K=ceil(M/$N_{group}$) PDSCHs are bundled in a time order to generate one bundled HARQ-ACK. If the number of the remaining PDSCHs is smaller than K, the remaining PDSCHs are bundled to generate one bundled HARQ-ACK. More specifically, PDSCH #0, PDSCH #1, . . . , and PDSCH #(K−1) are bundled to generate one bundled HARQ-ACK. PDSCH #(K), PDSCH #(K+1), . . . , and PDSCH #(2*K−1) are bundled to generate one bundled HARQ-ACK. Bundling continues as described and PDSCH #(floor (M/K)*K), above, PDSCH #(floor (M/K)*K+1), . . . , and PDSCH #(M−1) are bundled to generate one bundled HARQ-ACK. As a result, a total of $N_{group}$ bundled HARQ-ACK bits are generated.

As the second method, PDSCHs are bundled in a time order to make $N_{group}$ groups. The number of PDSCHs included in each of the groups may be ceil(M/$N_{group}$) or floor (M/$N_{group}$). Ceil (M/$N_{group}$) PDSCHs are bundled in a time order to make M mod $N_{group}$ groups, and then floor (M/$N_{group}$) PDSCHs are bundled in the time order to make $N_{group}$−(M mod $N_{group}$) groups. The HARQ-ACKs in each of the groups are bundled to generate one bundled HARQ-ACK. As a result, a total of $N_{group}$ bundled HARQ-ACK bits are generated.

As third information, the base station may configure a time interval for time domain bundling. The time interval may be configured in a unit of a slot. The time interval may be called a bundling window. A time interval (bundling window) configured in a unit of a slot is named $N_{slot}$. The terminal may bundle PDSCHs included in $N_{slot}$ slots to make one group. If there are one or more PDSCHs included in the group, the terminal may bundle HARQ-ACKs of the PDSCHs into one HARQ-ACK. A HARQ-ACK of a group not including PDSCHs may be configured as a NACK. A HARQ-ACK of a group not including PDSCHs may not be transmitted to the base station. The terminal may determine the $N_{slot}$ slots as follows.

As the first method, the terminal may bundle PDSCHs included in every $N_{slot}$ consecutive slots from slot 0 of a frame to make a group. That is, PDSCHs included in slot i*$N_{slot}$, slot i*$N_{slot}$+1, . . . , and slot (i+1)*$N_{slot}$−1 may be bundled to make a group. Here, i is an integer.

As the second method, the terminal may bundle PDSCHs included in every $N_{slot}$ consecutive slots from slot k of a frame to make a group. That is, PDSCHs included in slot i*$N_{slot}$+k, slot i*Nsiot+k+1, . . . , and slot (i+1)*$N_{slot}$−1+k may be bundled to make a group. For reference, PDSCHs included in slot 0, slot 1, . . . , and slot k−1 may be bundled to make one group. Here, i is an integer. Here, k may be a value configured for the terminal by the base station, k may be a value determined on the basis of the index of a slot on which the first PDSCH is scheduled, k may be a value determined on the basis of the index of a slot on which a PDCCH scheduling the PDSCHs is transmitted, or k may be a value determined on the basis of the index of a slot on which a PUCCH including a HARQ-ACK of the PDSCH is transmitted.

For example, if a value determined on the basis of the index of a slot on which the first PDSCH is scheduled is X, k may be equal to X. The first PDSCH is scheduled on slot 3, and thus PDSCHs included in slot 3, slot 4, slot 5, and slot 6 which are $N_{slot}$=4 slots from slot 3 are bundled to make one group, and the next $N_{slot}$=4 slots including slot 7, slot 8, slot 9, and slot 10 may be bundled to make one group.

For example, if a value determined on the basis of the index of a slot on which a PDCCH scheduling the PDSCHs is transmitted is X, k may be equal to X. The PDCCH is scheduled on slot 1, and thus PDSCHs included in slot 1, slot 2, slot 3, and slot 4 which are $N_{slot}$=4 slots from slot 1 are bundled to make one group, and the next $N_{slot}$=4 slots including slot 5, slot 6, slot 7, and slot 8 may be bundled to make one group.

For example, if the index of a slot on which a PUCCH including a HARQ-ACK of the PDSCH is transmitted is X, k may be equal to X mod $N_{slot}$. The PUCCH is scheduled on slot 10 and k=10 mod 4 is equal to 2, and thus PDSCHs included in slot 2, slot 3, slot 4, and slot 5 which are $N_{slot}$=4 slots from slot 2 are bundled to make one group, and the next $N_{slot}$=4 slots including slot 6, slot 7, slot 8, and slot 9 may be bundled to make one group.

For example, as illustrated in FIG. 20, if $N_{slot}$ is configured to be "3" and k is equal to n−5, slots from slot n−5 may be bundled to configure bundling windows each including 3 slots. That is, slot n−5, slot n−4, and slot n−3 are included in one bundling window (bundling window #A), and slot n−2, slot n−1, and slot n are included in another bundling window (bundling window #B). Therefore, PDSCHs included in bundling window #A may be bundled to generate one bundled HARQ-ACK bit, and PDSCHs included in bundling window #B may be bundled to generate one bundled HARQ-ACK bit.

A problem to be solved in the present invention relates to a method of, when time domain bundling as described above is configured for a terminal, generating a type-1 HARQ-ACK codebook by the terminal.

For explanation, in the present invention, it is assumed that a terminal has generated a group including PDSCHs bundled on the basis of the first information, second information, or third information. For convenience, the PDSCHs included in the group are PDSCH #n, PDSCH #(n+1), . . . , and PDSCH #(n+k−1). The number of the PDSCHs included in the group is k.

As the preferred first embodiment of the present invention, a terminal may select one from among PDSCHs included in a group as a representative. The terminal may generate a Type-1 HARQ-ACK codebook on the basis of a SLIV corresponding to the PDSCH.

A method of selecting one from among PDSCHs included in a group as a representative may include at least one of the followings.

As the first method, a PDSCH which is foremost in a time order among PDSCHs included in a group may be selected. For example, if PDSCHs included in a group are PDSCH #n, PDSCH #(n+1), . . . , and PDSCH #(n+k−1), PDSCH #n may be selected.

As the second method, a PDSCH which is rearmost in a time order among PDSCHs included in a group may be selected. For example, if PDSCHs included in a group are PDSCH #n, PDSCH #(n+1), . . . , and PDSCH #(n+k−1), PDSCH #(n+k−1) may be selected.

As the third method, a PDSCH occupying the most symbols among PDSCHs included in a group may be selected. If multiple PDSCHs occupy the same number of symbols, a PDSCH that is foremost or rearmost in a time order may be selected from thereamong.

As the fourth method, a PDSCH occupying the least symbols among PDSCHs included in a group may be selected. If multiple PDSCHs occupy the same number of symbols, a PDSCH that is foremost or rearmost in a time order may be selected from thereamong.

As the fifth method, a PDSCH, at least one symbol of which overlaps with a UL symbol according to a semi-static UL/DL configuration may be excluded from among the PDSCHs of the first method, second method, third method, and fourth method.

Figure 21:
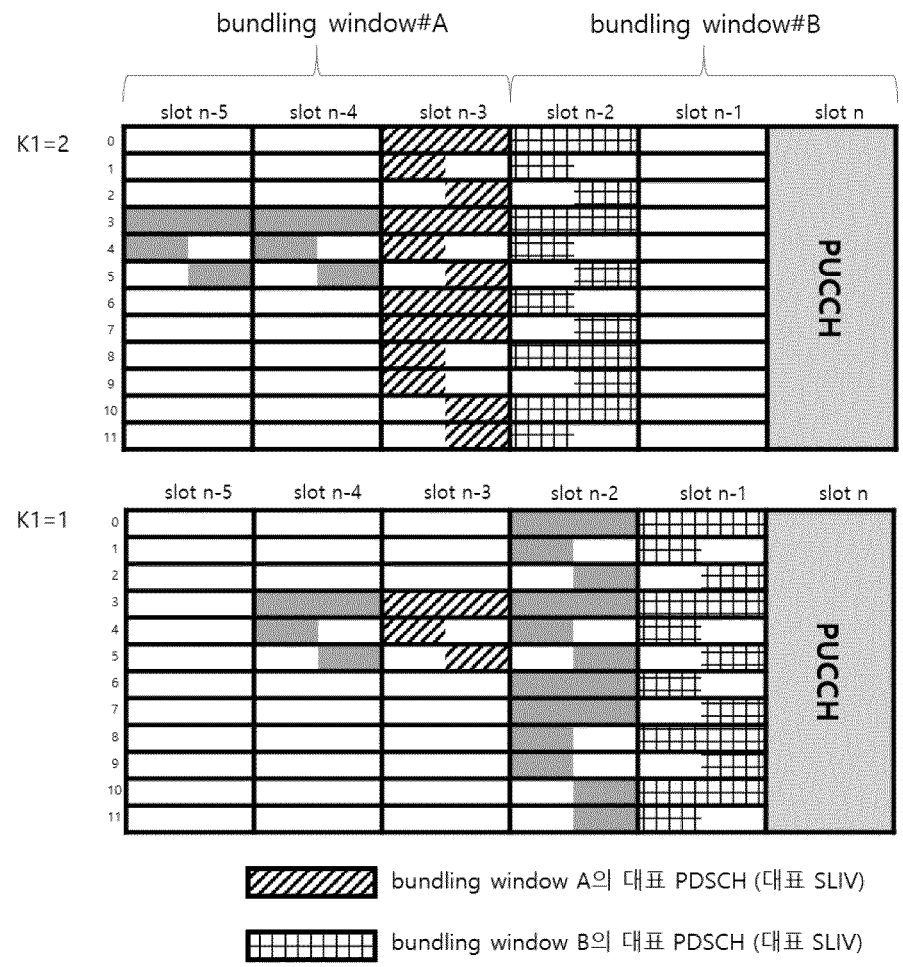
FIG. 21 is a diagram illustrating a representative PDSCH according to a time domain bundling window according to an embodiment of the present invention.

FIG. 21 is a diagram illustrating a representative PDSCH according to a time domain bundling window according to an embodiment of the present invention.

As illustrated in FIG. 21, if "3" is configured as the value of $N_{slot}$ for a terminal according to second information described above and the value of k is equal to "n−5", slots from slot n−5 may be bundled to configure bundling windows each including 3 slots. For example, slot n−5, slot n−4, and slot n−3 are included in one bundling window (bundling window #A), and slot n−2, slot n−1, and slot n are included in another bundling window (bundling window #B). The terminal may select, as a representative PDSCH (representative SLIV), a PDSCH candidate which is latest in a time sequence, from among PDSCH candidates of a bundling window. For example, 4 PDSCH candidates according to a K1 value of 2 and a TDRA index of 3 may be scheduled on slot n−5, slot n−4, slot n−3, and slot n−2. The first 3 PDSCH candidates thereamong (PDSCH candidates scheduled on slot n−5, slot n−4, and slot n−3) belong to bundling window #A. Therefore, the terminal may select, as a representative PDSCH (representative SLIV), a PDSCH candidate of slot n−3 which is a PDSCH candidate latest in a time sequence, from among the PDSCH candidates. Then, the 1 PDSCH candidate (PDSCH candidate scheduled on slot n−2) belong to bundling window #B. Therefore, the terminal may select, as a representative PDSCH (representative SLIV), a PDSCH candidate of slot n−2 which is a PDSCH candidate latest in a time sequence, from among the PDSCH candidate. The representative PDSCH (representative SLIV) selected in the above way is illustrated in FIG. 20.

In the following description, the selected PDSCH (SLIV corresponding thereto) is called a representative PDSCH (or representative SLIV). One representative PDSCH (or representative SLIV) is determined for each group. The terminal may generate a type-1 HARQ-ACK CB on the basis of a representative SLIV as followings.

1) Step 1: A set of indicatable K1 values is named K1_set. The terminal may determine the indexes of slots on which representative PDSCH candidates (representative SLIV candidates) are received, on the basis of K1_set and a TDRA table. A set of the indexes is called K_slot.

2) Step 2: The largest K1 value is retrieved from K_slot. This value is denoted as K1_max. The K1 value is excluded from K_slot.

3) Step 3: A set of representative PDSCH candidates (representative SLIV candidates) that can be received on slot n-K1_max is called R. When a symbol of a representative PDSCH candidate (representative SLIV candidate) included in set R overlaps with a symbol configured as uplink in a semi-static UL/DL configuration, the representative PDSCH candidate (representative SLIV candidate) is excluded from set R.

The representative PDSCH candidates (representative SLIV candidates) included in set R may be obtained as follows. One K1 value may be selected from K1 set. The selected K1 value is K1_a. The terminal may determine a representative PDSCH candidate (representative SLIV candidate) on slot n-K1_max on the basis of the K1_a value and the TDRA table.

4) Step 4: The terminal performs the following step A and step B for the representative PDSCH candidates (representative SLIV candidates) included in R.

A) A new HARQ-ACK occasion is assigned to a representative PDSCH candidate (representative SLIV candidate) having the foremost last symbol among the representative PDSCH candidates (representative SLIV candidates) of set R. Then, if set R includes representative PDSCH candidate(s) (representative SLIV candidate(s)), at least one symbol of which overlaps with the representative PDSCH candidate (representative SLIV candidate) having the foremost last symbol, the same HARQ-ACK occasion is assigned to the representative PDSCH candidate(s) (representative SLIV candidate(s)). The representative PDSCH candidate(s) (representative SLIV candidate (s)) to which the HARQ-ACK occasion is assigned (a representative PDSCH candidate (representative SLIV candidate) having the foremost last symbol and representative PDSCH candidate(s) (representative SLIV candidate(s)), at least one symbol of which overlaps with the representative PDSCH candidate (representative SLIV candidate)) are excluded from set R.

B) Until set R becomes a null set, step 4-A is repeated.

5) Step 5: Until K1_slot becomes a null set, steps 2/3/4 are repeated.

6) Step 6: The terminal may allocate B HARQ-ACK bits to the representative PDSCH candidates (representative SLIV candidates)) to which the same HARQ-ACK occasion is assigned. B is a maximum value of the number of PDSCHs included in a group including each of the representative PDSCH candidates (representative SLIV candidates)) to which the same HARQ-ACK occasion is assigned.

Figure 22:
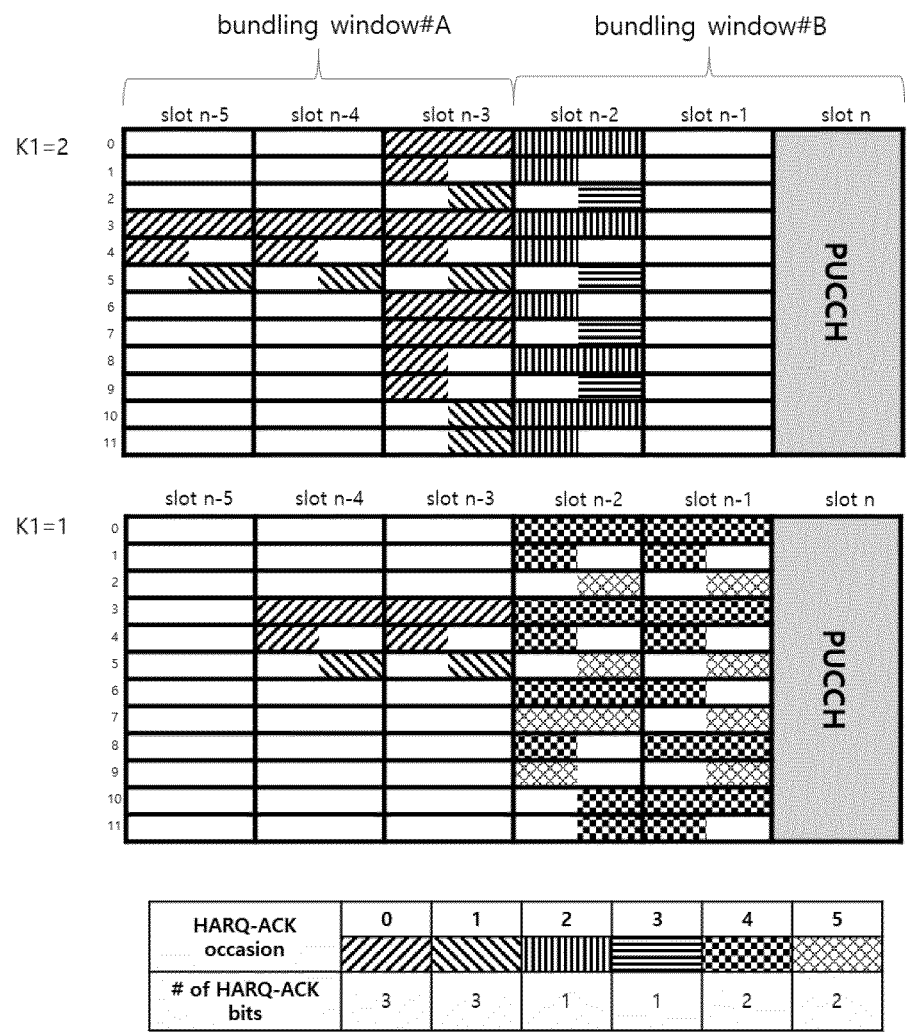
FIG. 22 is a diagram illustrating a HARQ-ACK occasion according to a time domain bundling window according to an embodiment of the present invention.

FIG. 22 is a diagram illustrating a HARQ-ACK occasion according to a time domain bundling window according to an embodiment of the present invention.

Referring to FIG. 22, in the embodiment described above, representative PDSCH candidates (representative SLIV candidates) may be determined according to FIG. 21.

1) Step 1:1 and 2 are configured for the terminal as K1 values and thus K1_set is equal to 1 and 2 (K1_set=1, 2). If the K1 value configured for the terminal is 2, representative PDSCH candidates (representative SLIV candidates) are located on slot n−3 and slot n−2. Therefore, the K1 values of the slots are 3 and 2. These two values may be included in K1_slot. If the K1 value configured for the terminal is 1, representative PDSCH candidates (representative SLIV candidates) are located on slot n−3 and slot n−1. Therefore, the K1 values of the slots are 3 and 1. These two values may be included in K1_slot. Therefore, K1_slot includes 1, 2, and 3.

2) Step 2: K1_max=3, the largest value is selected in K1_slot. The K1 value is excluded from K_slot.

3) Step 3: A set of representative PDSCH candidates (representative SLIV candidates) that can be received on slot n-K1_max=n−3 is called R. When a symbol of a representative PDSCH candidate (representative SLIV candidate) included in set R overlaps with a symbol configured as uplink in a semi-static UL/DL configuration, the representative PDSCH candidate (representative SLIV candidate) is excluded from set R. Here, all symbols are assumed to be downlink symbols.

The representative PDSCH candidates (representative SLIV candidates) included in set R on slot n−3 are (S=0, L=14), (S=0,L=7), and (S=7,L=7).

4) Step 4: The terminal performs the following step A and step B for the representative PDSCH candidates (representative SLIV candidates) included in R.
A) HARQ-ACK occasion 0 is assigned to (S=0,L=7) which is a representative PDSCH candidate (representative SLIV candidate) having the foremost last symbol among the representative PDSCH candidates of set R. Then, the same HARQ-ACK occasion is assigned to the representative PDSCH candidate (representative SLIV candidate) (S=0,L=14), at least one symbol of which overlaps with the representative PDSCH candidate (representative SLIV candidate) (S=0,L=7) having the foremost last symbol in set R. (S=0,L=7) and (S=0,L=14) which are representative PDSCH candidates (representative SLIV candidates) to which the HARQ-ACK occasion is assigned are excluded from set R. Therefore, set R is equal to (S=7,L=7).
B) Until set R becomes a null set, step 4-A is repeated.

5) Set R is not a null set, and thus step 4-A is repeated again. According to step 4-A, HARQ-ACK occasion 1 is assigned to the representative PDSCH candidate (representative SLIV candidate) (S=7,L=7) and set R becomes a null set. Therefore, step 4 is terminated.

5) Step 5: Until K1_slot becomes a null set, steps 2/3/4 are repeated.

K1_slot=2, 1 and thus is not a null set. K1_slot is not a null set, and thus steps 2/3/4 are repeated again.

According to the steps, PDSCH candidates and HARQ-ACK occasions are determined as follows.

HARQ-ACK occasion 0: Representative PDSCH candidates (S=0, L=7) and (S=0, L=14) of slot n−3

HARQ-ACK occasion 1: Representative PDSCH candidate (S=7, L=7) of slot n−3

HARQ-ACK occasion 2: Representative PDSCH candidates (S=0, L=7) and (S=0, L=14) of slot n−2

HARQ-ACK occasion 3: Representative PDSCH candidate (S=7, L=7) of slot n−2

HARQ-ACK occasion 4: Representative PDSCH candidates (S=0, L=7) and (S=0, L=14) of slot n−1

HARQ-ACK occasion 5: Representative PDSCH candidate (S=7, L=7) of slot n−1

Therefore, a Type-1 HARQ-ACK codebook may be configured by 6 HARQ-ACK occasions.

6) Step 6: The terminal may obtain the number of HARQ-ACK bits per HARQ-ACK occasion as follows.

The representative PDSCH candidates included in HARQ-ACK occasion 0 are (S=0, L=7) and (S=0, L=14), and TDRA indexes to which the representative PDSCH candidates belong in a bundling window are 0, 1, 3, 4, 6, 7, 8, and 9 when K1 is equal to 2, and are 3 and 4 when K1 is equal to 1. When K1 is equal to 2 and the TDRA index is 3, the most 3 PDSCH candidates exist in a bundling window, and thus HARQ-ACK occasion 0 includes 3 HARQ-ACK bits. Similarly, HARQ-ACK occasion 1 may include 3 HARQ-ACK bits, HARQ-ACK occasion 2 may include 1 HARQ-ACK bit, HARQ-ACK occasion 3 may include 1 HARQ-ACK bit, HARQ-ACK occasion 4 may include 2 HARQ-ACK bits, and HARQ-ACK occasion 5 may include 2 HARQ-ACK bits.

Therefore, a type-1 HARQ-ACK codebook may include a total of 12 HARQ-ACK bits.

Type-2 HARQ-ACK Codebook

A type-2 HARQ-ACK codebook may be configured for a terminal.

A Type-2 HARQ-ACK codebook may be configured by 2 sub-codebooks.

A first sub-codebook includes HARQ-ACK bits of PDSCHs corresponding to transport block (TB)-based transmission. If each of the PDSCHs corresponding TB-based transmission is configured to include 1 TB, 1 HARQ-ACK bit per PDSCH is generated, and each PDSCH is configured to include 2 TBs in at least one cell, 2 HARQ-ACK bits per PDSCH are generated. Therefore, P HARQ-ACK bits are generated per DCI scheduling TB-based transmission. P is the number of maximum TBs included in a PDSCH. For reference, if the number of TBs scheduled by DCI is smaller than P, as many HARQ-ACK bits as the deficient number are configured as NACKs.

A second sub-codebook includes HARQ-ACK bits of PDSCHs corresponding to code block group (CBG)-based transmission. A PDSCH corresponding to CBG-based transmission in cell c may be configured for the terminal to include $N_{CBG,c}$ CBGs per TB. The maximum value of (# of TBs of cell c)*$N_{CBG,c}$ for all cells for which CBG-based transmission is configured is denoted as $N_{CBG,max}$. The terminal generates $N_{CBG,max}$ HARQ-ACK bits per DCI scheduling the CBG-based transmission. For reference, if the number of CBGs scheduled by DCI is smaller than $N_{CBG,max}$, as many HARQ-ACK bits as the deficient number are configured as NACKS.

A problem to be solved in the present invention is a method of, when multiple PDSCHs are scheduled by one piece of DCI, determining a sub-codebook among the first sub-codebook and the second sub-codebook through which transmission is to be performed.

As the first method of the present invention, when multiple PDSCHs are scheduled by one piece of DCI (multi-PDSCH scheduling), a terminal always transmits an HARQ-ACK of the PDSCHs through a second sub-codebook. The second sub-codebook may be modified as follows.

A second sub-codebook includes HARQ-ACK bits of PDSCHs corresponding to code block group (CBG)-based transmission and HARQ-ACK bits of multiple PDSCHs when the multiple PDSCHs are scheduled by DCI. A PDSCH corresponding to CBG-based transmission in cell c may be configured for the terminal to include $N_{CBG,c}$ CBGs per TB. The maximum value of (# of TBs of cell c)*$N_{CBG,c}$ for all cells for which CBG-based transmission is configured is denoted as $N_{CBG,max}$. When multiple PDSCHs are scheduled for the terminal by DCI, the largest value of the number of multiple PDSCHs scheduled by one TDRA index is $N_{multi-PDSCH,max}$.

The terminal generates max ($N_{CBG,max}$, $N_{multi-PDSCH,max}$) HARQ-ACK bits per DCI indicating the CBG-based transmission. The terminal generates max ($N_{CBG,max}$, $N_{multi-PDSCH,max}$) HARQ-ACK bits per the DCI indicating the multi-PDSCH scheduling. If the number of CBGs scheduled by DCI is smaller than max ($N_{CBG,max}$, $N_{multi-PDSCH,max}$), as many HARQ-ACK bits as the deficient number are configured as NACKs. If the number of PDSCHs scheduled by DCI indicating multi-PDSCH scheduling is smaller than max ($N_{CBG,max}$, $N_{multi-PDSCH,max}$), as many HARQ-ACK bits as the deficient number are configured as NACKs.

As the second method of the present invention, when multiple PDSCHs are scheduled by one piece of DCI, a terminal selects a first sub-codebook or a second sub-codebook according to the number of the multiple PDSCHs to transmit an HARQ-ACK of the PDSCHs. The first sub-codebook and the second sub-codebook may be modified as follows.

The first sub-codebook includes HARQ-ACK bits of PDSCHs corresponding to transport block (TB)-based transmission, and HARQ-ACK bits of multiple PDSCHs if the number of the PDSCHs is equal to or smaller than X when the PDSCHs are scheduled by one piece of DCI. Each of the PDSCHs corresponding to TB-based transmission is assumed to be configured to include P TBs. P is the number of maximum TBs included in a PDSCH. Therefore, max{P, X} HARQ-ACK bits are generated per DCI scheduling TB-based transmission. For reference, if the number of TBs scheduled by DCI is smaller than max{P,X}, as many HARQ-ACK bits as the deficient number are configured as NACKs. Max {P,X} HARQ-ACK bits are generated per DCI scheduling TB-based transmission. For reference, DCI indicating multi-PDSCH scheduling includes X or fewer PDSCHs. If the number of PDSCHs scheduled by DCI indicating multi-PDSCH scheduling is smaller than max{P, X}, as many HARQ-ACK bits as the deficient number are configured as NACKs.

A second sub-codebook includes HARQ-ACK bits of PDSCHs corresponding to code block group (CBG)-based transmission and HARQ-ACK bits of multiple PDSCHs if the number of the multiple PDSCHs exceeds X when the PDSCHs are scheduled by DCI. A PDSCH corresponding to CBG-based transmission in cell c may be configured for the terminal to include $N_{CBG,c}$ CBGs per TB. The maximum value of (# of TBs of cell c)*$N_{CBG,c}$ for all cells for which CBG-based transmission is configured is denoted as $N_{CBG,max}$. When multiple PDSCHs are scheduled for the terminal by DCI, the largest value of the number of multiple PDSCHs scheduled by one TDRA index is $N_{multi-PDSCH,max}$. For reference, $N_{multi-PDSCH,max}$ is a value greater than X.

The terminal generates max ($N_{CBG,max}$, $N_{multi-PDSCH,max}$) HARQ-ACK bits per DCI indicating the CBG-based transmission. The terminal generates max ($N_{CBG,max}$, $N_{multi-PDSCH,max}$) HARQ-ACK bits per the DCI indicating the multi-PDSCH scheduling. If the number of CBGs scheduled by DCI is smaller than max ($N_{CBG,max}$, $N_{multi-PDSCH,max}$), as many HARQ-ACK bits as the deficient number are configured as NACKs. If the number of PDSCHs scheduled by DCI indicating multi-PDSCH scheduling is smaller than max ($N_{CBG,max}$, $N_{multi-PDSCH,max}$), as many HARQ-ACK bits as the deficient number are configured as NACKs.

In the above embodiment, X=P may be determined desirably. That is, if multi-PDSCH scheduling DCI schedules P or fewer PDSCHs, a HARQ-ACK of the PDSCHs is included in a first sub-codebook, and if multi-PDSCH scheduling DCI schedules PDSCHs more than X, an HARQ-ACK of the PDSCHs is included in a second sub-codebook.

The above two methods may be modified as follows when a type-2 HARQ-ACK codebook and time domain bundling are simultaneously configured.

As the modified second method of the present invention, when multiple PDSCHs are scheduled by one piece of DCI, a terminal selects and transmits a first sub-codebook or a second sub-codebook according to the number of bundled HARQ-ACK bits corresponding to the DCI. The first sub-codebook and the second sub-codebook may be modified as follows.

The first sub-codebook includes HARQ-ACK bits of PDSCHs corresponding to transport block (TB)-based transmission, and bundled HARQ-ACK bits if bundled HARQ-ACKs corresponding to the DCI has X bits or smaller when multiple PDSCHs are scheduled by one piece of DCI. Each of the PDSCHs corresponding to TB-based transmission is assumed to be configured to include P TBs. P is the number of maximum TBs included in a PDSCH. Therefore, max{P, X} HARQ-ACK bits are generated per DCI scheduling TB-based transmission. For reference, if the number of TBs scheduled by DCI is smaller than max{P,X}, as many HARQ-ACK bits as the deficient number are configured as NACKs. Max {P,X} bundled HARQ-ACK bits are generated per DCI scheduling TB-based transmission. For reference, DCI indicating multi-PDSCH scheduling corresponds to X or fewer bundled HARQ-ACK bits. If the number of bundled HARQ-ACK bits corresponding to DCI indicating multi-PDSCH scheduling is smaller than max{P,X}, as many bundled HARQ-ACK bits as the deficient number are configured as NACKs.

A second sub-codebook includes HARQ-ACK bits of PDSCHs corresponding to code block group (CBG)-based transmission and bundled HARQ-ACK bits if bundled HARQ-ACKs corresponding to DCI exceed X bits when multiple PDSCHs are scheduled by the DCI. A PDSCH corresponding to CBG-based transmission in cell c may be configured for the terminal to include $N_{CBG,c}$ CBGs per TB. The maximum value of (# of TBs of cell c)*$N_{CBG,c}$ for all cells for which CBG-based transmission is configured is denoted as $N_{CBG,max}$. When multiple PDSCHs are scheduled for the terminal by DCI, the largest value of the number of bundled HARQ-ACK bits corresponding to one TDRA index is $N_{bundled,max}$. For reference, $N_{bundled,max}$ is a value greater than X.

The terminal generates max ($N_{CBG,max}$, $N_{bundled,max}$) HARQ-ACK bits per DCI indicating the CBG-based transmission. The terminal generates max ($N_{CBG,max}$, $N_{bundled,max}$) HARQ-ACK bits per the DCI indicating the multi-PDSCH scheduling. If the number of CBGs scheduled by DCI is smaller than max ($N_{CBG,max}$, $N_{bundled,max}$), as many HARQ-ACK bits as the deficient number are configured as NACKs. If the number of bundled HARQ-ACK bits corresponding to DCI indicating multi-PDSCH scheduling is smaller than max ($N_{CBG,max}$, $N_{bundled,max}$), as many bundled HARQ-ACK bits as the deficient number are configured as NACKs.

For example, it is assumed that a terminal always generates 1 bundled HARQ-ACK bit for DCI indicating multi-PDSCH scheduling. In this case, the terminal always includes the bundled HARQ-ACK bit as a first sub-codebook.

Method of Assigning HARQ Process Number when Multiple PDSCHs or Multiple PUSCHs are Scheduled As described above, in NR, multiple PDSCHs or multiple PUSCHs may be scheduled on multiple slots. Multiple PDSCHs or multiple PUSCHs may be scheduled through one piece of DCI, and a HARQ-ACK for the scheduled multiple PDSCHs may be transmitted on one or more slots through a PUCCH.

In this case, assignment of HARQ process numbers (or HARQ process IDs) to the scheduled multiple PDSCHs or multiple PUSCHs becomes a problem. In particular, in a case where a symbol of multiple slots on which multiple PDSCHs or multiple PUSCHs are scheduled overlaps with a symbol configured for a different purpose through higher layer signaling (e.g., TDD-UL-DL-ConfigurationCommon or TDD-UL-DL-ConfigurationDedicated that is RRC configuration information), configuration of a HARQ process number corresponding to each PDSCH or each PUSCH configuring the multiple PDSCHs or multiple PUSCHs may be problematic.

Hereinafter, a problem to be solved in the present invention relates to a method of, when PDSCHs or PUSCHs are scheduled as multi-slot scheduling through one piece of DCI, assigning HARQ process numbers (HPNs) for PDSCHs or PUSCHs that are scheduled on multiple slots and thus individually scheduled on respective slots.

When PDSCHs or PUSCHs are scheduled as multi-slot scheduling through one piece of DCI, a PDSCH or PUSCH scheduled on symbol(s), in particular, flexible symbol(s) may collide with different DL or UL slots and symbols, and in addition, the ambiguity for HPNs between a terminal and a base station may occur when a terminal configured to monitor DCI 2_0, that is, an SFI, has received same or has failed in receiving same. Therefore, a method for solving this problem is provided.

Specifically, in a case where multiple PDSCHs or multiple PUSCHs are scheduled on multiple slots through one piece of DCI, the DCI may indicate the HARQ process number of a first PDSCH among the multiple PDSCHs or a first PUSCH among the PUSCHs. Thereafter, the HARQ process number may be increased by 1 according to a scheduling sequence of the PDSCH or PUSCH.

That is, the HARQ process number of a PDSCH after the first PDSCH or a PUSCH after the first PUSCH is increased by "1". A symbol of a slot on which the first PDSCH or the first PUSCH is transmitted does not overlap with a UL symbol indicated by RRC configuration information.

However, in a case where a symbol included in each of the slots on which the multiple PDSCHs or multiple PUSCHs are scheduled overlaps with a UL symbol or DL symbol indicated by RRC configuration information, a PDSCH or PUSCH is not transmitted on the corresponding symbol, and the HARQ process number of the PDSCH or PUSCH of the slot is not increased. Thereafter, if a PDSCH scheduled on the next slot is valid (valid PDSCH) or a PUSCH scheduled on the next slot is valid (valid PUSCH), the HARQ process number is increased.

Specifically, in a case where multiple PDSCHs are scheduled through one piece of DCI, if a symbol of a slot on which a first PDSCH is transmitted does not overlap with a symbol configured as a UL symbol by RRC configuration information, a HARQ process number indicated by the DCI is applied to the first PDSCH. After the first PDSCH, if a symbol of a slot on which the next PDSCH is transmitted does not overlap with a UL symbol indicated by RRC configuration information or overlaps with a DL symbol indicated by the RRC configuration information, a valid PDSCH may be received, and the HARQ process number is increased by "1". However, if a symbol of the slot on which the next PDSCH is scheduled overlaps with a UL symbol indicated by the RRC configuration information, the next PDSCH is not received and the HARQ process number is not increased.

If a symbol of slots on which multiple PDSCHs are scheduled overlaps with a flexible symbol indicated by RRC configuration information, the HARQ process number may be increased regardless of whether a PDSCH is received. That is, even though a flexible symbol is indicated as being UL or flexible by an SFI of DCI format 2_0 and thus a PDSCH is not received, the HARQ process number may be increased. That is, the format of a symbol indicated by an SFI may not be related to whether the HARQ process number is increased. This can solve the problem about whether the HARQ process number is increased when the ambiguity between a terminal and a base station occurs because an SFI is not detected.

If a UL symbol indicated by RRC configuration information and a symbol of a slot overlap with each other and thus reception of a PDSCH is not performed and the HARQ process number is not increased, when a PDSCH scheduled on a slot after the slot on which the PDSCH is not received is valid, the HARQ process number is increased by "1".

In a case where multiple PUSCHs are scheduled through one piece of DCI, if a symbol of a slot on which a first PUSCH is transmitted does not overlap with a symbol configured as a DL symbol by RRC configuration information, a HARQ process number indicated by the DCI is applied to the first PUSCH. After the first PUSCH, if a symbol of a slot on which the next PUSCH is transmitted does not overlap with a DL symbol indicated by RRC configuration information or overlaps with a UL symbol indicated by the RRC configuration information, a valid PUSCH may be transmitted, and the HARQ process number is increased by "1". However, if a symbol of the slot on which the next PUSCH is scheduled overlaps with a DL symbol indicated by the RRC configuration information, the next PUSCH is not transmitted and the HARQ process number is not increased.

If a symbol of slots on which multiple PUSCHs are scheduled overlaps with a flexible symbol indicated by RRC configuration information, the HARQ process number may be increased according to whether reception of a particular signal (e.g., synchronization signal/PBCH block (SSB)) on the symbol is configured. If reception of a particular signal is not configured on the symbol, even though the symbol is indicated as being DL or flexible by an SFI of DCI format 2_0 and thus a PUSCH is not transmitted, the HARQ process number may be increased. That is, the format of a symbol indicated by an SFI may not be related to whether the HARQ process number is increased. Whether reception of a particular signal is configured may be determined on the basis of SSB indexes provided by SSBPositioninburst as RRC configuration information. An SSB may be indicated (or configured) as whether the SSB is received, by SSBPositioninburst that is a higher layer parameter of RRC configuration information. That is, if a terminal receives RRC configuration information, the terminal may determine whether an SSB is configured, through SSBPositioninburst that is a parameter included in the RRC configuration information. In a case where transmission of multiple PUSCHs is scheduled and a symbol of a slot on which a PUSCH among the multiple PUSCHs is scheduled overlaps with a flexible symbol indicated by RRC configuration information, if reception of a particular signal on the symbol is configured, transmission of the PUSCH is not performed and the HARQ process number is not increased.

However, in a case where transmission of multiple PUSCHs is scheduled and a symbol of a slot on which a PUSCH among the multiple PUSCHs is scheduled overlaps with a flexible symbol indicated by RRC configuration information, if reception of a particular signal on the symbol is not configured, the HARQ process number is increased regardless of whether the PUSCH is transmitted. If reception of a particular signal is not configured on the symbol, even though the symbol is indicated as being DL or flexible by an SFI of DCI format 2_0 and thus a PUSCH is not transmitted, the HARQ process number may be increased. This can solve the problem about whether the HARQ process number is increased when the ambiguity between a terminal and a base station occurs because an SFI is not detected.

If a DL symbol indicated by RRC configuration information and a symbol of the slot overlap with each other and thus transmission of a PUSCH is not performed and the HARQ process number is not increased, when a PUSCH scheduled on a subsequent slot is valid, the HARQ process number is increased by "1".

As a flexible symbol configured by RRC configuration information, a symbol not indicated as a DL symbol or UL symbol by RRC configuration information may be indicated. That is, if a symbol is not indicated as a DL symbol or UL symbol by RRC configuration information, the symbol may be recognized as being implicitly indicated as a flexible symbol.

In other words, in a case where multiple PDSCHs (or multiple PUSCHs) are scheduled for a terminal, the terminal may expect that a base station indicates valid PDSCH (or PUSCH) resources for a first scheduled PDSCH (or first scheduled PUSCH), apply an HPN indicated by DCI to the valid PDSCH (or PUSCH), and increase the HPN for subsequent PDSCHs among the multiple PDSCHs by 1.

DL/flexible symbols that are configured by tdd-UL-DL-ConfigurationCommon or tdd-UL-DL-ConfigurationDedicated and are not UL slots/symbols are all considered in a case of a PDSCH as valid PDSCH (or PUSCH) resources in the above description and, however, if a PDSCH scheduled on a flexible symbol collides with UL, the corresponding HPN is not skipped (i.e., the HPN is increased by 1) and the HPN of subsequent PDSCHs is increased by 1.

UL/flexible symbols that are configured by tdd-UL-DL-ConfigurationCommon or tdd-UL-DL-ConfigurationDedicated and are not DL slots/symbols are all considered in a case of a PUSCH as valid PDSCH (or PUSCH) resources in the above description and, however, if a PUSCH scheduled on a flexible symbol collides with DL, the corresponding HPN is not skipped (i.e., the HPN is increased by 1) and the HPN of subsequent PUSCHs is increased by 1.

As another embodiment of the present invention, resources of a pre-configured channel, such as an SPS-PDSCH or CG-PUSCH, may be considered as valid PDSCH (or PUSCH) resources for assignment of an HPN to a first scheduled PDSCH (or first scheduled PUSCH) in a case where multiple PDSCHs (or multiple PUSCHs) are scheduled for a terminal. However, the terminal may skip the HPN of a pre-configured channel, such as a pre-configured SPS-PDSCH or CG-PUSCH, and assign the HPN to the multiple PDSCHs (or PUSCHs) while sequentially increasing same by 1.

Unlink this, resources of a pre-configured channel, such as an SPS-PDSCH or CG-PUSCH, may be considered as valid PDSCH (or PUSCH) resources for assignment of an HPN to a first scheduled PDSCH (or first scheduled PUSCH) in a case where multiple PDSCHs (or multiple PUSCHs) are scheduled for a terminal. If resources scheduled by a base station to be dynamic overlap with a pre-configured channel, such as a pre-configured SPS-PDSCH or CG-PUSCH, the terminal may expect that the base station does not consider the HPN of the pre-configured SPS-PDSCH or CG-PUSCH, may not skip the HPN of the pre-configured SPS-PDSCH or CG-PUSCH, and assign the HPN to the multiple PDSCHs (or multiple PUSCHs) while sequentially increasing same by 1.

As another embodiment of the present invention, in a case where multiple PDSCHs (or multiple PUSCHs) are scheduled for a terminal, the terminal may expect that a base station indicates valid PDSCH (or PUSCH) resources for a first scheduled PDSCH (or first scheduled PUSCH), apply an HPN indicated by DCI to the valid PDSCH (or PUSCH), and increase the HPN for subsequent PDSCHs among the multiple PDSCHs by 1.

DL/flexible symbols that are configured by tdd-UL-DL-ConfigurationCommon or tdd-UL-DL-ConfigurationDedicated and are not UL slots/symbols are all considered in a case of a PDSCH as valid PDSCH (or PUSCH) resources in the above description and, however, if a PDSCH scheduled on a flexible symbol collides with an SSB transmitted by a base station, the increasing of the HPN by 1 is skipped (i.e., the HPN is not increased by 1) and the HPN of subsequent PDSCHs is increased by 1. The terminal may not expect scheduling of multiple PDSCHs on flexible symbols configured to receive SSB transmission, and the terminal may assume, for SSB reception corresponding to SSB transmission from the base station, that one or more SSBs having candidate SSB indexes corresponding to SSB indexes provided by SSB-PositionsInBurst configured by the base station may be transmitted, and may not expect scheduling of multiple PDSCHs on flexible symbols configured to receive the SSB transmission.

UL/flexible symbols that are configured by tdd-UL-DL-ConfigurationCommon or tdd-UL-DL-ConfigurationDedicated and are not DL slots/symbols are all considered in a case of a PUSCH as valid PDSCH (or PUSCH) resources in the above description and, however, if a PUSCH scheduled on a flexible symbol collides with an SSB, the increasing of the HPN by 1 is skipped (i.e., the HPN is not increased by 1) and the HPN of subsequent PUSCHs is increased by 1. The terminal may not expect scheduling of multiple PUSCHs on flexible symbols configured to receive an SSB, and the terminal may assume, for SSB reception corresponding to SSB transmission from the base station, that one or more SSBs having candidate SSB indexes corresponding to SSB indexes provided by SSB-PositionsInBurst configured by the base station may be transmitted, and may not expect scheduling of multiple PUSCHs on flexible symbols configured to receive the SSB transmission. In a case where multiple PUSCHs are scheduled by the base station for the terminal on flexible symbols on which SSB reception may be assumed, if what is scheduled is a first scheduled PUSCH among the multiple PUSCHs or a scheduled PUSCH after the first scheduled PUSCH among the multiple PUSCHs, when the scheduled PUSCH for the terminal collides with the SSB, the increasing of the HPN by 1 is skipped (i.e., the HPN is not increased by 1) and the HPN of subsequent PUSCHs is increased by 1.

DL/flexible symbols that are configured by tdd-UL-DL-ConfigurationCommon or tdd-UL-DL-ConfigurationDedicated and are not UL slots/symbols are all considered in a case of a PDSCH as valid PDSCH (or PUSCH) resources in the above description and, however, if a PDSCH scheduled on a flexible symbol collides with group common signaling transmitted by a base station, for example, a UL cancellation indication, a slot format indication (SFI), or a rate-matching pattern indication, the increasing of the HPN by 1 is not skipped (i.e., the HPN is increased by 1) and the HPN of subsequent PDSCHs is increased by 1. As described above, in a case of a dynamic indication, when the terminal receives or fails to receive same, the ambiguity between a terminal and a base station may occur. Therefore, the terminal may operate on the basis of scheduling indicated by the base station so as to resolve the ambiguity. However, with respect to a resource configuration enabling the terminal and the base station to identically understand with RRC signaling, there is no room for ambiguity between the terminal and the base station, and thus the terminal is allowed to perform an operation corresponding to an RRC configuration without change.

UL/flexible symbols that are configured by tdd-UL-DL-ConfigurationCommon or tdd-UL-DL-ConfigurationDedicated and are not DL slots/symbols are all considered in a case of a PUSCH as valid PDSCH (or PUSCH) resources in the above description and, however, if a PUSCH scheduled on a flexible symbol collides with group common signaling transmitted by a base station, for example, a UL cancellation indication, a slot format indication (SFI), or a rate-matching pattern indication, the increasing of the HPN by 1 is not skipped (i.e., the HPN is increased by 1) and the HPN of subsequent PUSCHs is increased by 1. As described above, in a case of a dynamic indication, when the terminal receives or fails to receive same, the ambiguity between a terminal and a base station may occur. Therefore, the terminal may operate on the basis of scheduling indicated by the base station so as to resolve the ambiguity. However, with respect to a resource configuration enabling the terminal and the base station to identically understand with RRC signaling, there is no room for ambiguity between the terminal and the base station, and thus the terminal is allowed to perform an operation corresponding to an RRC configuration without change.

Figure 23:
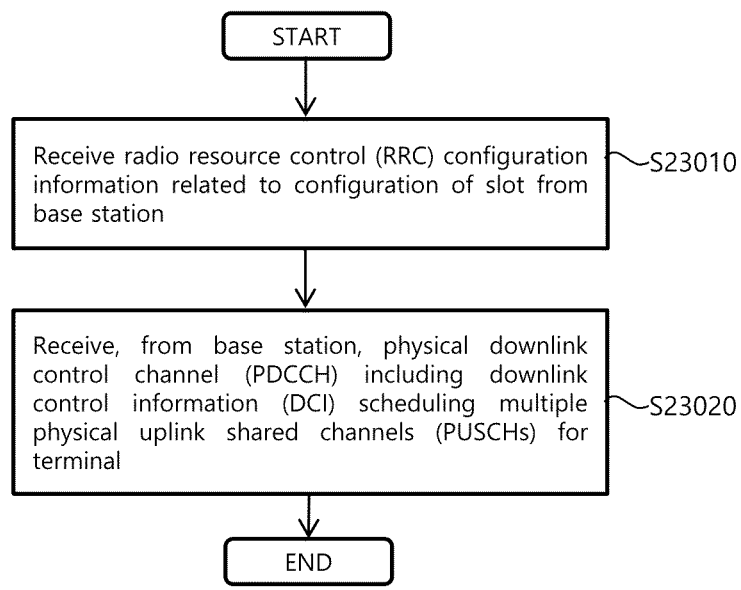
FIG. 23 is a flowchart illustrating an example of an operation of a terminal according to an embodiment of the present invention.

FIG. 23 is a flowchart illustrating an example of an operation of a terminal according to an embodiment of the present invention.

Referring to FIG. 23, in a case where transmission of multiple PUSCHs is scheduled through one piece of DCI, a terminal may configure HARQ process numbers for the multiple PUSCHs.

Specifically, the terminal receives radio resource control (RRC) configuration information related to a configuration of a slot from a base station (operation S23010). The RRC configuration information may include at least one of TDD-UL-DL-ConfigurationDedicated or TDD-UL-DLConfigurationCommon.

Thereafter, the terminal receives, from the base station, a physical downlink control channel (PDCCH) including downlink control information (DCI) scheduling multiple physical uplink shared channels (PUSCHs) for the terminal (operation S23030).

The DCI may indicate a hybrid automatic repeat request (HARQ) process number of a first PUSCH among the multiple PUSCHs, and a HARQ process number of a PUSCH included in the multiple PUSCHs may be increased compared to a HARQ process number of a previous PUSCH of the PUSCH according to whether a symbol of a slot on which the PUSCH is scheduled overlaps with a symbol indicated as being downlink or flexible by the RRC configuration information.

Specifically, as described above, in a case where multiple PUSCHs are scheduled through one piece of DCI, if a symbol of a slot on which a first PUSCH is transmitted does not overlap with a symbol configured as a DL symbol by RRC configuration information, a HARQ process number indicated by the DCI is applied to the first PUSCH. After the first PUSCH, if a symbol of a slot on which the next PUSCH is scheduled does not overlap with a DL symbol indicated by RRC configuration information or overlaps with a UL symbol indicated by the RRC configuration information, a valid PUSCH may be transmitted, and the HARQ process number is increased by "1". However, if a symbol of the slot on which the next PUSCH is scheduled overlaps with a DL symbol indicated by the RRC configuration information, the next PUSCH is not transmitted and the HARQ process number is not increased.

If a symbol of slots on which multiple PUSCHs are scheduled overlaps with a flexible symbol indicated by RRC configuration information, the HARQ process number may be increased according to whether reception of a particular signal (e.g., synchronization signal/PBCH block (SSB)) on the symbol is configured. If reception of a particular signal is not configured on the symbol, even though the symbol is indicated as being DL or flexible by an SFI of DCI format 2_0 and thus a PUSCH is not transmitted, the HARQ process number may be increased. That is, the format of a symbol indicated by an SFI may not be related to whether the HARQ process number is increased. Whether reception of a particular signal is configured may be determined on the basis of SSB indexes provided by SSBPositioninburst as RRC configuration information. An SSB may be indicated (or configured) as whether the SSB is received, by SSBPositioninburst that is a higher layer parameter of RRC configuration information. That is, if a terminal receives RRC configuration information, the terminal may determine whether an SSB is configured, through SSBPositioninburst that is a parameter included in the RRC configuration information.

That is, in a case where transmission of multiple PUSCHs is scheduled and a symbol of a slot on which a PUSCH among the multiple PUSCHs is scheduled overlaps with a flexible symbol indicated by RRC configuration information, if reception of a particular signal on the symbol is configured, transmission of the PUSCH is not performed and the HARQ process number is not increased.

However, in a case where transmission of multiple PUSCHs is scheduled and a symbol of a slot on which a PUSCH among the multiple PUSCHs is scheduled overlaps with a flexible symbol indicated by RRC configuration information, if reception of a particular signal on the symbol is not configured, the HARQ process number is increased regardless of whether the PUSCH is transmitted. If reception of a particular signal is not configured on the symbol, even though the symbol is indicated as being DL or flexible by an SFI of DCI format 2_0 and thus a PUSCH is not transmitted, the HARQ process number may be increased. This can solve the problem about whether the HARQ process number is increased when the ambiguity between a terminal and a base station occurs because an SFI is not detected.

If a DL symbol indicated by RRC configuration information and a symbol of the slot overlap with each other and thus transmission of a PUSCH is not performed and the HARQ process number is not increased, when a PUSCH scheduled on a subsequent slot is valid, the HARQ process number is increased by "1".

As a flexible symbol configured by RRC configuration information, a symbol not indicated as a DL symbol or UL symbol by RRC configuration information may be indicated. That is, if a symbol is not indicated as a DL symbol or UL symbol by RRC configuration information, the symbol may be recognized as being implicitly indicated as a flexible symbol.

The above description of the present invention is used for exemplification, and a person who has common knowledge in the technical field to which the present invention belongs would understand that the present invention can be easily modified to other detailed forms without changing the technical idea or an essential feature thereof. Thus, it is to be appreciated that the embodiments described above are intended to be illustrative in every sense, and not restrictive. For example, each element described as a single type may be implemented to be distributed and similarly, elements described to be distributed may also be implemented in an associated form.

The scope of the present invention is represented by the claims to be described below rather than the detailed description, and it is to be interpreted that the meaning and scope of the claims and all the changes or modified forms derived from the equivalents thereof fall within the scope of the present invention.

The invention claimed is:

1. A terminal of a wireless communication system, the terminal comprising:
a communication module; and
a processor,
wherein the processor is configured to:
receive radio resource control (RRC) configuration information related to a configuration of a slot from a base station; and
receive, from the base station, a physical downlink control channel (PDCCH) including downlink control information (DCI),
wherein the DCI schedules multiple physical uplink shared channels (PUSCHs) and indicates a hybrid automatic repeat request (HARQ) process number of a specific PUSCH among the multiple PUSCHs, and
wherein the specific PUSCH with the HARQ process number indicated by the DCI is an earliest PUSCH that does not overlap with a downlink symbol indicated by the RRC configuration information.

2. The terminal of claim 1,
wherein a HARQ process number of a PUSCH constituting the multiple PUSCHs excluding the specific PUSCH is increased than a HARQ process number of a previous PUSCH of the PUSCH depending on whether a symbol of a slot on which the PUSCH is scheduled overlaps with a downlink symbol indicated by the RRC configuration information.

3. The terminal of claim 2,
wherein, when the symbol of the slot on which the PUSCH is scheduled is indicated as an uplink symbol by the RRC configuration information, the HARQ process number of the PUSCH is increased by "1" compared to the HARQ process number of the previous PUSCH.

4. The terminal of claim 2,
wherein, when the symbol of the slot on which the PUSCH is scheduled overlaps with the downlink symbol indicated by the RRC configuration information, the PUSCH is not transmitted on the slot.

5. The terminal of claim 4,
wherein the HARQ process number of the PUSCH is not increased compared to the HARQ process number of the previous PUSCH.

6. The terminal of claim 4,
wherein, when the symbol of a slot on which a next PUSCH of the PUSCH among the multiple PUSCHs is scheduled is indicated as an uplink symbol by the RRC configuration information, a HARQ process number of the next PUSCH is increased by "1" compared to the HARQ process number of the previous PUSCH.

7. The terminal of claim 2,
wherein, when the symbol of the slot on which the PUSCH is scheduled overlaps with a flexible symbol indicated by the RRC configuration information, the HARQ process number of the PUSCH is increased by "1" compared to the HARQ process number of the previous PUSCH according to whether a particular signal is configured on the flexible symbol.

8. The terminal of claim 7,
wherein the particular signal is a synchronization signal/PBCH block (SSB) indicated by SSBpositioninburst that is a RRC information element.

9. The terminal of claim 7,
wherein, when the particular signal is not configured on the flexible symbol, the HARQ process number of the PUSCH is increased by "1" compared to the HARQ process number of the previous PUSCH.

10. The terminal of claim 9,
wherein the HARQ process number of the PUSCH is increased by "1" compared to the HARQ process number of the previous PUSCH regardless of whether the symbol of the slot on which the PUSCH is scheduled is indicated as being uplink, downlink, or flexible by a slot format indicator (SFI).

11. A terminal of a wireless communication system, the terminal comprising:
a communication module; and
a processor,
wherein the processor is configured to:
receive radio resource control (RRC) configuration information related to a configuration of a slot from a base station; and
receive, from the base station, a physical downlink control channel (PDCCH) including downlink control information (DCI),
wherein the DCI schedules multiple physical downlink shared channels (PDSCHs) and indicates a hybrid automatic repeat request (HARQ) process number of a specific PDSCH among the multiple PDSCHs, and
wherein the specific PDSCH with the HARQ process number indicated by the DCI is an earliest PDSCH that does not overlap with a uplink symbol indicated by the RRC configuration information.

12. The terminal of claim 11,
wherein a HARQ process number of a PDSCH constituting the multiple PDSCHs excluding the specific PDSCH is increased than a HARQ process number of a previous PDSCH of the PDSCH depending on whether a symbol of a slot on which the PDSCH is scheduled overlaps with an uplink symbol indicated by the RRC configuration information.

13. The terminal of claim 12,
wherein, when the symbol of the slot on which the PDSCH is scheduled is indicated as a downlink symbol by the RRC configuration information, the HARQ process number of the PDSCH is increased by "1" compared to the HARQ process number of the previous PDSCH.

14. The terminal of claim 12,
wherein, when the symbol of the slot on which the PDSCH is scheduled overlaps with the uplink symbol indicated by the RRC configuration information, the PDSCH is not received on the slot.

15. The terminal of claim 14,
wherein the HARQ process number of the PDSCH is not increased compared to the HARQ process number of the previous PDSCH.

16. The terminal of claim 14,
wherein, when the symbol of a slot on which a next PDSCH of the PDSCH among the multiple PDSCHs is scheduled is indicated as a downlink symbol by the RRC configuration information, a HARQ process number of the next PDSCH is increased by "1" compared to the HARQ process number of the previous PDSCH.

17. The terminal of claim 12,
wherein, when the symbol of the slot on which the PDSCH is scheduled overlaps with a flexible symbol indicated by the RRC configuration information, the HARQ process number of the PDSCH is increased by "1" compared to the HARQ process number of the previous PDSCH.

18. The terminal of claim 17,
wherein the HARQ process number of the PDSCH is increased by "1" compared to the HARQ process number of the previous PDSCH regardless of whether the symbol of the slot on which the PDSCH is scheduled is indicated as being uplink, downlink, or flexible by a slot format indicator (SFI).

19. A method of transmitting a physical uplink shared channel (PUSCH) by a terminal in a wireless communication system, the method comprising:
receiving radio resource control (RRC) configuration information related to a configuration of a slot from a base station; and
receiving, from the base station, a physical downlink control channel (PDCCH) including downlink control information (DCI),
wherein the DCI schedules multiple physical uplink shared channels (PUSCHs) and indicates a hybrid automatic repeat request (HARQ) process number of a specific PUSCH among the multiple PUSCHs, and
wherein the specific PUSCH with the HARQ process number is indicated by the DCI is an earliest PUSCH that does not overlap with a downlink symbol indicated by the RRC configuration information.

* * * * *